US010769917B2

(12) United States Patent
Imamura et al.

(10) Patent No.: US 10,769,917 B2
(45) Date of Patent: Sep. 8, 2020

(54) WIRELESS COMMUNICATIONS SYSTEM AND METHOD FOR CONTROLLING COMMUNICATIONS TERMINAL

(71) Applicant: Panasonic Intellectual Property Management Co., Ltd., Osaka (JP)

(72) Inventors: Koji Imamura, Tokyo (JP); Shinichi Okada, Tokyo (JP); Motoo Nakagawa, Tokyo (JP); Masahiro Kumagawa, Hyogo (JP); Junichi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/386,730

(22) Filed: Apr. 17, 2019

(65) Prior Publication Data
US 2019/0325723 A1 Oct. 24, 2019

(30) Foreign Application Priority Data

Apr. 20, 2018 (JP) .................................. 2018-081740

(51) Int. Cl.
*H04W 4/02* (2018.01)
*G08B 13/24* (2006.01)
(52) U.S. Cl.
CPC ........ *G08B 13/2462* (2013.01); *H04W 4/027* (2013.01)
(58) Field of Classification Search
CPC .............. G08B 13/2462; H04W 4/027; H04W 52/0254; H04W 52/028; H04M 2250/04; H04M 1/7253; H04M 2250/12; H04B 1/1615; H04B 1/38

USPC .......... 340/10.33, 693.3; 455/344, 41.1, 41.2
See application file for complete search history.

(56) References Cited

U.S. PATENT DOCUMENTS

| 5,119,504 | A | * | 6/1992 | Durboraw, III | G01S 19/17 340/991 |
| 6,006,096 | A | * | 12/1999 | Trompower | H04W 64/00 455/443 |
| 9,071,282 | B1 | * | 6/2015 | Want | H04B 5/02 |
| 2005/0153705 | A1 | * | 7/2005 | Gramakov | H04W 4/029 455/456.1 |
| 2005/0164633 | A1 | * | 7/2005 | Linjama | H04B 1/1615 455/41.2 |

(Continued)

FOREIGN PATENT DOCUMENTS

| EP | 2421233 B1 * | 6/2014 |
| JP | 4978791 A | 4/2012 |
| JP | 2012-173837 A | 9/2012 |

*Primary Examiner* — Nathan S Taylor
(74) *Attorney, Agent, or Firm* — Pearne & Gordon LLP

(57) ABSTRACT

A wireless communications system according to an aspect includes a communications terminal, a detection unit, and a control unit. The communications terminal includes a communications unit to communicate wirelessly with a communications partner terminal. The detection unit detects movement of the communications terminal. The control unit controls the communications terminal so as to vary a communicable area of the communications unit. The communicable area is defined relatively to the communications terminal. The control unit varies the communicable area according to at least magnitude of the movement detected by the detection unit.

14 Claims, 13 Drawing Sheets

(56) References Cited

U.S. PATENT DOCUMENTS

| | | | | |
|---|---|---|---|---|
| 2010/0009643 A1* | 1/2010 | Haartsen | ........... | H04W 52/0251 455/127.5 |
| 2012/0040610 A1* | 2/2012 | Moosavi | ........... | H04W 52/0254 455/41.1 |
| 2012/0214513 A1* | 8/2012 | Hashimoto | ......... | H04W 64/006 455/456.2 |
| 2013/0079037 A1* | 3/2013 | Dobyns | ................ | H04W 4/023 455/456.3 |
| 2013/0295842 A2* | 11/2013 | Griffin | .............. | H04W 52/0254 455/41.1 |
| 2015/0358778 A1* | 12/2015 | Heo | ..................... | H04W 4/023 455/456.6 |

* cited by examiner

WIRELESS COMMUNICATIONS SYSTEM AND METHOD FOR CONTROLLING COMMUNICATIONS TERMINAL

CROSS-REFERENCE TO RELATED APPLICATION

This application claims the benefit of foreign priority to Japanese Patent Application No. 2018-81740 filed on Apr. 20, 2018, which is assigned to the assignee of the present application and the entire contents of which are hereby incorporated by reference.

TECHNICAL FIELD

The present disclosure generally relates to a wireless communications system and a method for controlling a communications terminal, and more particularly relates to a wireless communications system configured to allow a communications terminal to communicate wirelessly with a communications partner terminal and a method for controlling the communications terminal.

BACKGROUND ART

Document 1 (JP 2012-173837 A) teaches a technique for allowing a communications terminal (mobile telecommunications terminal) to read information about a plurality of target communications partner terminals (contactless communications media) via wireless communication.

Document 1 teaches using, as targets, a plurality of storage boxes aligned and piled up densely at a single predetermined location and reading information about communications partner terminals, which are electronic tags such as radio frequency identifiers (RFID) tags attached to those storage boxes, using a communications terminal. According to Document 1, the person in charge of reading performs the operation of reading information about the electronic tags attached to those storage boxes by directing the communications terminal toward the storage boxes. This allows the communications terminal to acquire information about all electronic tags at a time that are present within a range in which the communications terminal is able to establish wireless communication.

While the read operation is performed, however, a fading phenomenon, causing a variation in the reception level of radio waves transmitted from the communications terminal, sometimes takes place due to interference of the radio waves resulting from reflection of the radio waves, thus possibly producing a space, in which communication loses its stability (i.e., a so-called "null spot"), around the communications terminal. Then, if any communications partner terminal is present in such a space around the communications terminal where communication loses its stability, communication between the communications partner terminal and the communications terminal may be unable to be established successfully.

SUMMARY

The present disclosure provides a wireless communications system and a method for controlling a communications terminal with the ability to increase the communication success rate even when the fading phenomenon takes place.

A wireless communications system according to an aspect of the present disclosure includes a communications terminal, a detection unit, and a control unit. The communications terminal includes a communications unit to communicate wirelessly with a communications partner terminal. The detection unit detects movement of the communications terminal. The control unit controls the communications terminal so as to vary a communicable area of the communications unit. The communicable area is defined relatively to the communications terminal. The control unit varies the communicable area according to at least magnitude of the movement detected by the detection unit.

A method for controlling a communications terminal according to another aspect of the present disclosure is designed to control a communications terminal including a communications unit to communicate wirelessly with a communications partner terminal. The method includes varying a communicable area of the communications unit according to at least magnitude of movement of the communications terminal. The communicable area is defined relatively to the communications terminal.

DESCRIPTION OF EMBODIMENTS

First Embodiment (1) Overview

Figure 1:
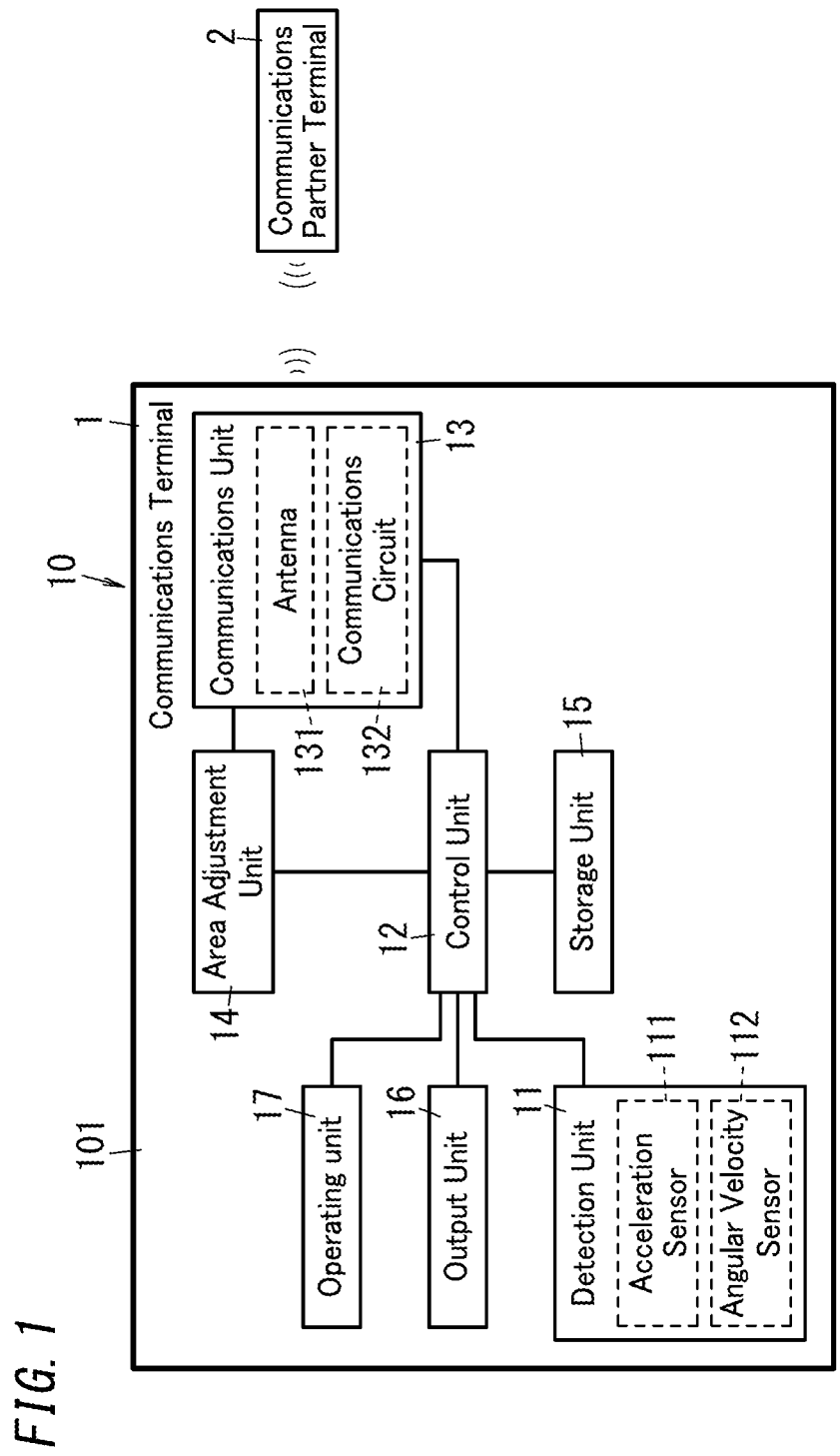
FIG. 1 is a block diagram illustrating a schematic configuration for a wireless communications system according to a first embodiment.

A wireless communications system 10 according to a first exemplary embodiment is designed to allow a communications terminal 1 to communicate wirelessly with a communications partner terminal 2 as shown in FIG. 1. In an exemplary wireless communications system 10 of this type, the communications terminal 1 performs transfer of information with the communications partner terminal 2 by a contactless method by using radio waves as a communication medium. In the following description of embodiments, the communications partner terminal 2 is not a constituent element of the wireless communications system 10. However, this is only an example and should not be construed as limiting. Alternatively, the communications partner terminal 2 may also be a constituent element of the wireless communications system 10.

The wireless communications system 10 according to this embodiment includes the communications terminal 1, a detection unit 11, and a control unit 12. The communications terminal 1 includes a communications unit 13 for communicating wirelessly with the communications partner terminal 2.

In this wireless communications system 1, the detection unit 11 detects the movement of the communications terminal 1. The control unit 12 controls the communications terminal 1 so as to vary a communicable area 8 (see FIG. 2) of the communications unit 13. The communicable area 8 is defined relatively to the communications terminal 1. The control unit 12 varies the communicable area 8 according to at least magnitude of the movement, detected by the detection unit 11, of the communications terminal 1.

As used herein, the "movement" refers to a change in position, orientation, or any other parameter in a three-dimensional space of the communications terminal 1. For example, if attention is paid to the acceleration, the greater the acceleration applied to the communications terminal 1 is, the more significant the "movement" of the communications terminal 1 is. Also, as used herein, the "communicable area" refers to an area, surrounding the communications terminal 1, where wireless communication with the communications terminal 1 is able to be established. For example, a communications partner terminal 2 falling within the communicable area 8 is able to communicate wirelessly with the communications terminal 1.

That is to say, in the wireless communications system 10 according to this embodiment, the area where the communications terminal 1 is able to establish communication with the communications partner terminal 2 (i.e., the communicable area 8 as viewed from the communications terminal 1) is variable. In addition, the communicable area 8 is varied by the control unit 12 according to the magnitude of the movement of the communications terminal 1. Thus, even when the fading phenomenon, causing a variation in the reception level of radio waves transmitted from the communications terminal 1, takes place due to, for example, interference of the radio waves resulting from reflection of the radio waves and other factors, this wireless communications system 10 is still able to increase the success rate of communication between the communications partner terminal 2 and the communications terminal 1.

In summary, the wireless communications system 10 according to this embodiment allows, when the communications terminal 1 has no movement, a relative positional relationship between the communications partner terminal 2 and the communicable area 8 to be changed by varying the communicable area 8. The wireless communications system 10 according to this embodiment also allows, when the communications terminal 1 has some movement, the relative positional relationship between the communications partner terminal 2 and the communicable area 8, to be changed even without varying the communicable area 8. That is to say, the wireless communications system 10 according to this embodiment allows the relative positional relationship between the communications partner terminal 2 and the communicable area 8 to be changed appropriately without depending on the movement of the communications terminal 1. Thus, even when a space where communication loses its stability (i.e., a so-called "null spot") is produced around the communications terminal 1 due to the fading phenomenon, changing the relative positional relationship between the communications partner terminal 2 and the communicable area 8 allows the communications partner terminal 2 to get out of the null spot easily. This eventually increases the success rate of communication between the communications partner terminal 2 and the communications terminal 1.

A wireless communications system 10 according to this embodiment may be introduced into various types of retail stores including convenience stores, supermarkets, department stores, drugstores, apparel stores, consumer electronics megastores, and DIY stores (i.e., what are called "home centers" in Japan) to make inventory management and inspection. Specifically, the wireless communications system 10 may be used to read commodity information from commodities (goods) 9 in stock in order to make inventory management of the in- and out-of-stock commodities 9 (see FIG. 2) at a store, for example. The wireless communications system 10 may also be used to read commodity information from the commodities 9 that have just arrived and become in stock in order to make inspection by counting the number of the commodities 9 that have arrived at the store, for example.

Specifically, the wireless communications system 10 makes the communications terminal 1, including the communications unit 13, communicate wirelessly with the communications partner terminal 2 via radio waves as a communication medium. The communications partner terminal 2 may be an electronic tag attached to a commodity 9 and stores at least commodity information about the commodity 9. As used herein, the "commodity information" is information for identifying the commodity 9. In Japan, a commodity identification code such as a Japanese Article Number (JAN) code is used as an example of such commodity information. Examples of other commodity identification codes of this type include European Article Number (EAN) code used in Europe and other countries, and Universal Product Code (UPC) used in the United States and other countries.

That is to say, the communications terminal 1 reads commodity information by a contactless method from the communications partner terminal 2 (electronic tag) attached to a commodity 9, instead of reading the commodity information directly from the commodity 9. The commodity information read by the communications terminal 1 is transmitted from the communications terminal 1 to, and managed by, a high-order system such as a store computer. Optionally, the commodity information may include not just information to identify the type of a given commodity 9 but also serial numbers and other pieces of information to identify multiple commodities 9 of the same type individually. This allows, even when there are multiple commodities 9 of the same type, the communications terminal 1 to identify those commodities 9 of the same type on an individual basis by the commodity information.

In such a wireless communications system 10, the communications terminal 1 communicates wirelessly with a plurality of communications partner terminals 2 (electronic tags) via radio waves as a communication medium, thereby acquiring commodity information about a plurality of commodities 9 at a time. Thus, this wireless communications system 10 is applicable particularly effectively to acquiring commodity information about a plurality of commodities 9 such as the inventory management and inspection at a store as mentioned above. Also, as is often the case in such an application, users 7 who are not used to handling the communications terminal 1 (such as part-timers) (see FIG. 2) may have to use the communications terminal 1. Therefore, changing the relative positional relationship between the communications partner terminal 2 and the communicable area 8 appropriately without depending on the movement of the communications terminal 1 as is done in the wireless communications system 10 according to this embodiment increases the success rate of communication between the communications partner terminal 2 and the communications terminal 1, thus eventually leading to improvement in work efficiency as well.

(2) Configuration

Next, the configuration of the wireless communications system 10 according to this embodiment will be described in detail. In the embodiment to be described below, the wireless communications system 10 is supposed to be introduced into a convenience store as an example.

The wireless communications system 10 includes the communications terminal 1, the detection unit 11, and the control unit 12, as described above.

In this embodiment, the communications terminal 1 is a device for reading commodity information about a commodity 9 by communicating wirelessly with the communications partner terminal 2 (electronic tag) attached to the commodity 9 via radio waves as a communication medium, and may be implemented as a reader that forms part of a radio frequency identification (RFID) system. That is to say, the communications terminal 1 communicates wirelessly with the communications partner terminal 2 implemented as an electronic tag in the RFID system, thereby acquiring commodity information stored in the communications partner terminal 2. Note that the communications partner terminal 2 needs to be attached to at least one item and the item is not always a commodity 9. The "commodity information" is a kind of "item information" that is information about an item to which the communications partner terminal 2 is attached. That is to say, if the communications partner terminal 2 is attached to an item (such as a piece of equipment at a store) other than the commodities 9, the communications partner terminal 2 stores item information about that item. In other words, the communications partner terminal 2 is an electronic tag attached to at least one item (e.g., a commodity 9 in this embodiment). The communications terminal 1 reads item information (e.g., commodity information in this embodiment) about an item (e.g., a commodity 9 in this embodiment) by communicating wirelessly with the communications partner terminal 2 via radio waves as a communication medium.

The communications partner terminal 2 may be, for example, a passive radio frequency (RF) tag and includes a memory to store at least the commodity information. In this embodiment, a plurality of communications partner terminals 2 are associated one to one with a plurality of commodities 9. Each of the communications partner terminals 2 stores commodity information about an associated commodity 9. In other words, each communications partner terminal 2 is attached to an associated commodity 9.

The communications partner terminal 2 may be attached to a commodity 9 in any arbitrary manner as long as the communications partner terminal 2 and the commodity 9 may be handled in an integrated state (i.e., not separately). Therefore, the communications partner terminal 2 may be attached to the commodity 9 in various manners. Specifically, in this embodiment, the communications partner terminal 2 may be formed as a seal, which is stuck onto the commodity 9. Alternatively, the communications partner terminal 2 may be bound with a strap to the commodity 9. Still alternatively, the communications partner terminal 2 may be integrated with a packing material for the commodity 9. Yet alternatively, the communications partner terminal 2 may also be embedded in the commodity 9 or form an integral part of the commodity 9. Optionally, the communications partner terminal 2 may be formed by printing directly on the commodity 9 itself or on the surface of a packing material for the commodity 9 by some printing technique such as a coating semiconductor.

The communications terminal 1 includes not only the communications unit 13 but also an area adjustment unit 14, a storage unit 15, an output unit 16, and an operating unit 17 as well as shown in FIG. 1. In this case, the communications terminal 1 is not a stationary one but a portable, mobile terminal. In this embodiment, the communications terminal 1 may be, for example, a handheld terminal which may be carried by the user 7 (see FIG. 2). Therefore, the housing 101 (see FIG. 2) has a size and shape appropriate for the user 7 to operate the terminal manually in his or her hand. The handheld communications terminal 1 is powered by a battery (such as a primary battery or a secondary battery) housed in the housing 101. In this embodiment, the detection unit 11 and the control unit 12, as well as the communications unit 13, are housed in the housing 101 of the communications terminal 1. In other words, the detection unit 11 and the control unit 12 are integrated with the communications terminal 1.

The detection unit 11 detects the movement of the communications terminal 1. The detection unit 11 is electrically connected to the control unit 12 and the result of detection by the detection unit 11 is output to the control unit 12. In this embodiment, the detection unit 11 may include, for example, an acceleration sensor 111 and an angular velocity sensor 112.

The acceleration sensor 111 is provided in the housing 101 to detect the acceleration applied to the housing 101 and output an electrical signal representing the magnitude of the acceleration. In this embodiment, the acceleration sensor 111 may be implemented as a triaxial acceleration sensor with the ability to measure the acceleration in three axes, namely, X-, Y-, and Z-axes that intersect with each other at right angles. That is to say, the acceleration sensor 111 senses the magnitude of the acceleration in each of the X-, Y-, and Z-axis directions that are perpendicular to each other. Then, the acceleration sensor 111 outputs electrical signals, representing the magnitudes of the acceleration in these three axial directions, to the control unit 12.

The angular velocity sensor 112 is also provided in the housing 101 to detect the angular velocity applied to the housing 101 by a change in the orientation of the housing 101 and output an electrical signal representing the magnitude of the angular velocity. In this embodiment, the angular velocity sensor 112 may be implemented as a triaxial angular velocity sensor with the ability to measure the angular velocity in three axes, namely, X-, Y-, and Z-axes that intersect with each other at right angles. That is to say, the angular velocity sensor 112 senses the magnitude of the angular velocity of rotation around each of the X-, Y-, and Z-axis directions that are perpendicular to each other. Then, the angular velocity sensor 112 outputs electrical signals, representing the magnitudes of the angular velocity in these three axial directions, to the control unit 12.

The control unit 12 controls the communications terminal 1 so as to vary the communicable area 8 (see FIG. 2) of the communications unit 13 as will be described later. The communicable area 8 is an area, surrounding the communications terminal 1, where wireless communication with the communications terminal 1 is able to be established. The communicable area 8 is defined relatively to the communications terminal 1. That is to say, the control unit 12 controls the communications terminal 1 so as to vary the communicable area 8 that is defined relatively to the communications terminal 1. In this embodiment, the control unit 12 is electrically connected to the area adjustment unit 14, and varies the communicable area 8 of the communications unit 13 by controlling at least the area adjustment unit 14. In addition, the control unit 12 controls not only the area adjustment unit 14 but also the communications unit 13, the output unit 16, the operating unit 17, and other constituent elements of the communications terminal 1 as well.

The control unit 12 varies the communicable area 8 based on at least the magnitude of the movement, detected by the detection unit 11, of the communications terminal 1. That is to say, the control unit 12 varies the communicable area 8 in accordance with the result of detection provided by the detection unit 11. The control unit 12 varying the communicable area 8 defined relatively to the communications terminal 1 changes the area where the communications terminal 1 is able to communicate with the communications partner terminal 2. That is why even if the positional relationship between the housing 101 of the communications terminal 1 and the communications partner terminal 2 (including the orientation of either the housing 101 or the communications partner terminal 2) is fixed, varying the communicable area 8 also causes a change in the relative positional relationship between the communicable area 8 and the communications partner terminal 2. The function and operation of the control unit 12 will be described in detail later in the "(3) Operation" section.

In this embodiment, the control unit 12 is implemented as a microcomputer including, as its major components, a central processing unit (CPU) and a memory. In other words, since the control unit 12 is configured as a computer including a CPU and a memory, the computer functions as the control unit 12 by making the CPU execute a program stored in the memory. In this embodiment, the program is stored in advance in the memory of the control unit 12. However, this is only an example and should not be construed as limiting. Alternatively, the program may also be downloaded via a telecommunications line such as the Internet or distributed after having been stored on a non-transitory storage medium such as a memory card.

The communications unit 13 communicates wirelessly with the communications partner terminal 2. In this embodiment, the communications unit 13 communicates wirelessly with the communications partner terminal 2 located at a distance of, for example, a few meters or less from the communications terminal 1 via radio waves as a communication medium. The communications unit 13 includes an antenna 131 and a communications circuit 132.

The antenna 131 transmits and receives radio waves as a communication medium to/from the communications partner terminal 2 present within the communicable area 8. The antenna 131 is electrically connected to the communications circuit 132. The antenna 131 is suitably implemented as a circularly polarized antenna, considering its plane of polarization. Alternatively, the antenna 131 may also be implemented as an elliptically polarized plane antenna. Still alternatively, the antenna 131 may also be implemented as a linearly polarized antenna to have multiple different planes of polarization. Specifically, the antenna 131 may be implemented as a patch antenna, a monopolar antenna, an inverted F antenna, or a slot antenna, for example. The antenna 131 may be exposed on the surface of the housing 101 or embedded in the housing 101, without limitation.

The communications circuit 132 transmits radio waves from the antenna 131 to the communications partner terminal 2 to communicate wirelessly with the communications partner terminal 2, which is activated by the radio waves, via the radio waves as a communication medium. In this embodiment, the communications terminal 1 acquires commodity information from the communications partner terminal 2, and therefore, the communications circuit 132 receives information, including at least the commodity information, from the communications partner terminal 2 when wireless communication is established with the communications partner terminal 2.

The area adjustment unit 14 has the capability of adjusting the communicable area 8 of the communications unit 13. That is to say, the communicable area 8 defined relatively to the communications terminal 1 is adjusted by the area adjustment unit 14. In this embodiment, the communications unit 13 communicates wirelessly with the communications partner terminal 2 via radio waves as a communication medium. Thus, the communicable area 8 needs to be an area wide enough for each of the communications terminal 1 (communications unit 13) and the communications partner terminal 2 to receive radio waves from the terminal at the other end at a minimum required reception level, to say the least.

In this embodiment, the control unit 12 varies the communicable area 8 by changing at least one parameter selected from the group consisting of: the directivity of the communication medium that the communications unit 13 uses to communicate with the communications partner terminal 2; the transmission strength of the communication medium; and the reception sensitivity of the communication medium. In this embodiment, the communication medium is radio waves as described above. Also, the control unit 12 varies the communicable area 8 by controlling the area adjustment unit 14. Therefore, it is virtually the area adjustment unit 14 that varies the communicable area 8. That is to say, the area adjustment unit 14 varies the communicable area 8 by changing at least one of the directivity, transmission strength, or reception sensitivity of the radio waves as a communication medium.

In this embodiment, the area adjustment unit 14 varies the communicable area 8 by changing the radio wave directivity of the communications unit 13, for example. Specifically, the area adjustment unit 14 changes the directivity of the antenna 131, and thereby changes the radio wave directivity of the communications unit 13, by mechanically changing the orientation of the antenna 131 of the communications unit 13 with a motor, for example (i.e., by so-called "mechanical scanning"). Alternatively, the area adjustment unit 14 may also change the directivity of the antenna 131, and thereby change the radio wave directivity of the communications unit 13, by electron scanning method without changing the orientation of the antenna 131. In the latter case, the antenna 131 may be implemented as an array antenna including a plurality of antenna elements that are aligned with each other. In that case, the area adjustment unit 14 changes the directivity of the antenna 131 by controlling the relative phase between the respective antenna elements of the array antenna and changing the direction of a beam (radio waves) radiated from the antenna 131. The electron scanning method eliminates the need to use any mechanism (including a motor) for mechanically changing the orientation of the antenna 131. Optionally, the area adjustment unit 14 may also change the directivity of the antenna 131 by adopting the electron scanning method and the mechanical scanning method in combination.

Also, the area adjustment unit 14 changes the radio wave directivity of the communications unit 13 basically one-dimensionally along one direction. This allows the communicable area 8 to move linearly, e.g., move up and down and to the right or to the left. Alternatively, the area adjustment unit 14 may also change the radio wave directivity of the communications unit 13 two-dimensionally or even three-dimensionally. When the directivity changes two-dimensionally, the communicable area 8 is able to rotate so as to draw a circle on a plane, for example. When the directivity changes three-dimensionally, the communicable area 8 is able to move spirally in a three-dimensional space, for example.

The storage unit 15 may be implemented as a programmable nonvolatile memory such as an electrically erasable programmable read-only memory (EEPROM). The storage unit 15 stores at least the commodity information that the communications unit 13 has received from the communications partner terminal 2. The storage unit 15 is able to store commodity information of multiple commodities. Therefore, if the communications unit 13 has received commodity information from multiple communications partner terminals 2, then commodity information of those commodities is stored in the storage unit 15.

The output unit 16 outputs the information stored in the storage unit 15, i.e., information such as the commodity information that the communications unit 13 has received from the communications partner terminal 2. The output unit 16 may output the information by presenting the information on the display of the communications terminal 1. The output unit 16 also has the capability of outputting information by transmitting (or transferring) information such as the commodity information to a high-order system (such as a store computer) or any other device such as a mobile telecommunications device (such as a smartphone or a tablet computer). However, this is only an example and should not be construed as limiting. Alternatively, the output unit 16 may also output information such as the commodity information either by emitting a verbal message or by printing, for example.

Figure 2:
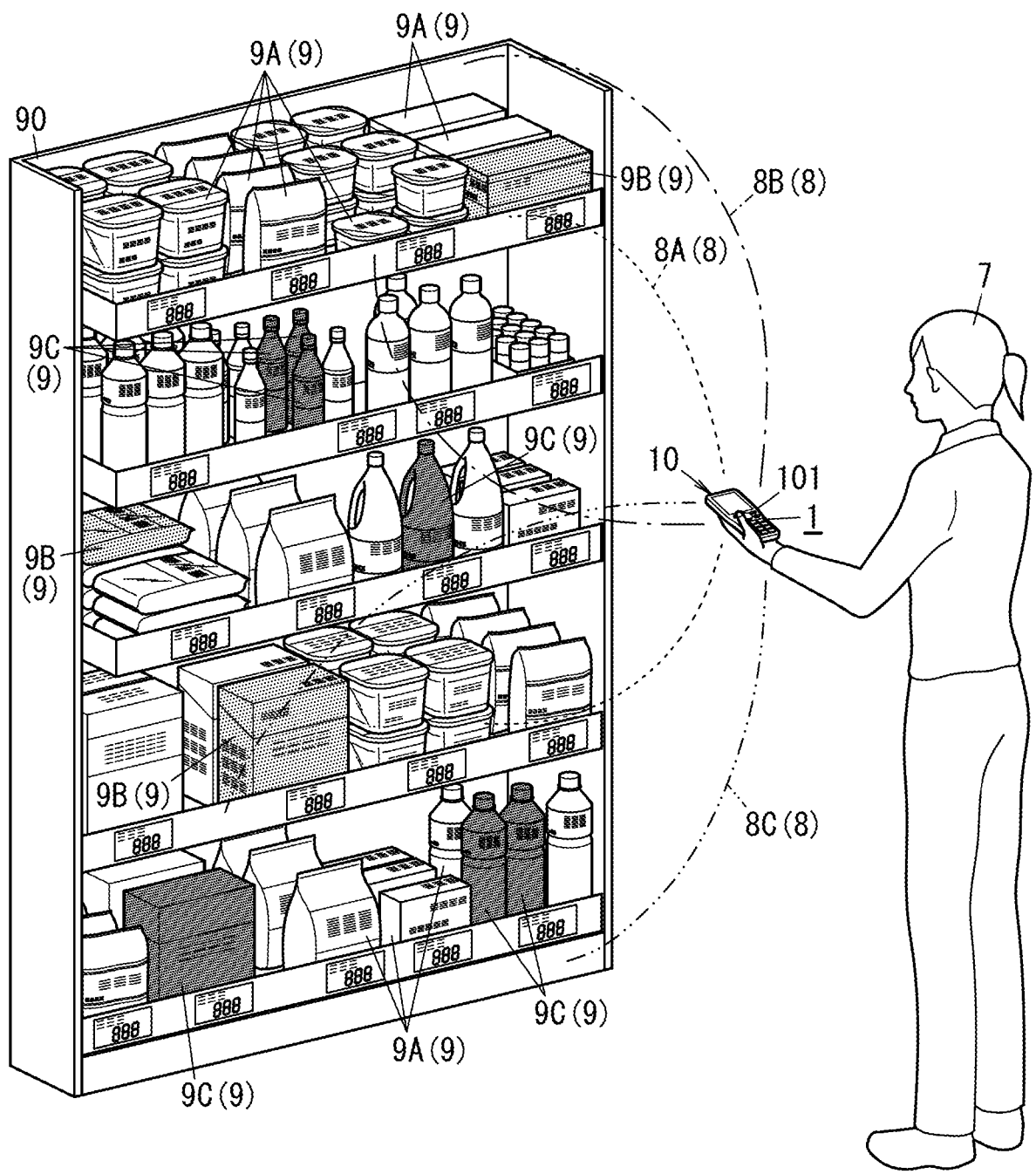
FIG. 2 depicts how the wireless communications system may be used.

The operating unit 17 accepts the user's command (see FIG. 2). The operating unit 17 may include a plurality of mechanical switches or may be implemented as a touchscreen panel, for example. Alternatively, the operating unit 17 may also be configured to receive an operating signal representing the user's command from a mobile telecommunications device (such as a smartphone or a tablet computer) with the ability to communicate with the communications terminal 1.

(3) Operation (3.1) Basic Operation

Figure 3:
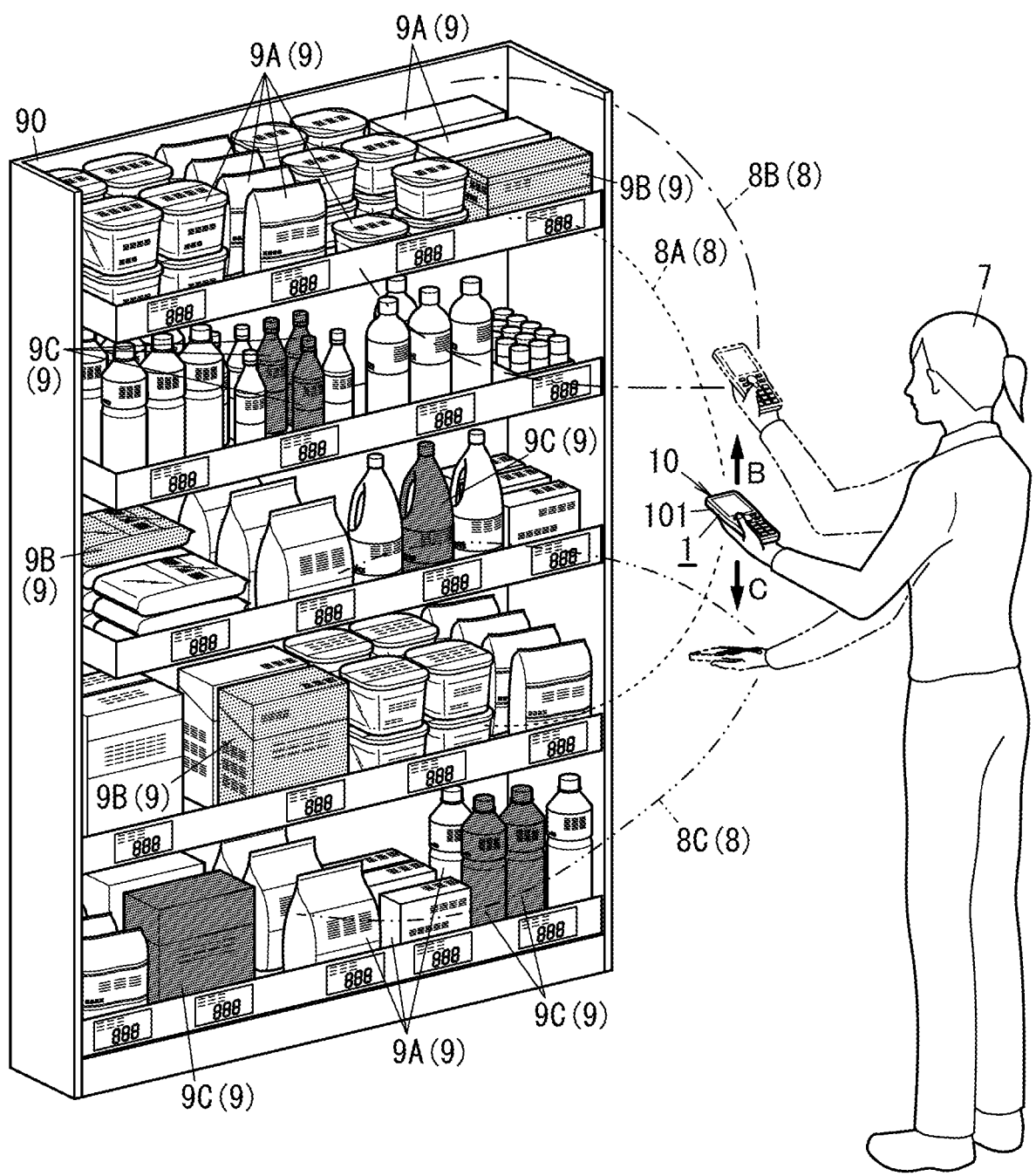
FIG. 3 depicts how the wireless communications system may also be used.
Figure 4:
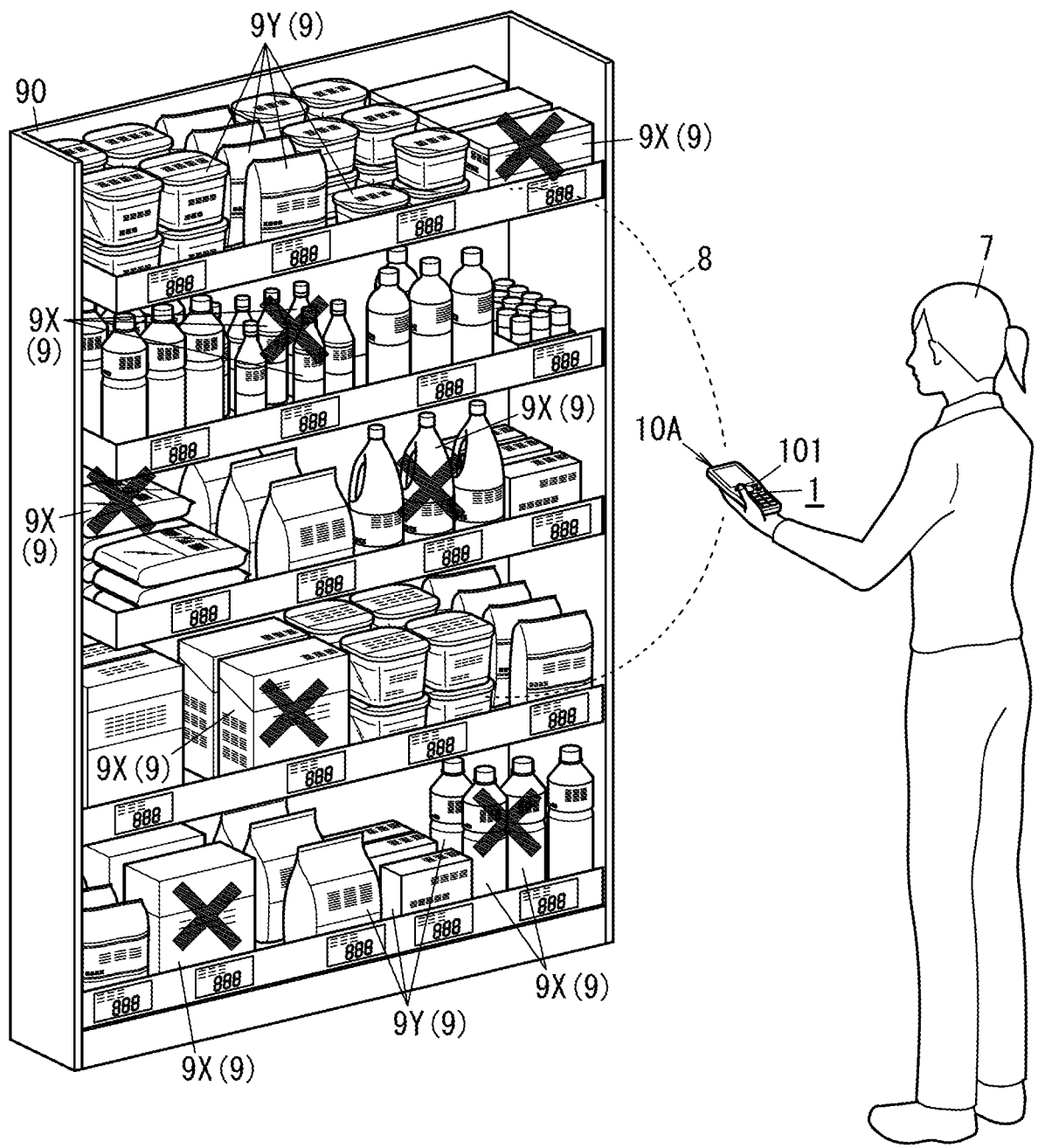
FIG. 4 depicts how a wireless communications system according to a comparative example may be used.

Next, it will be described with reference to FIGS. 2-4 how the wireless communications system 10 according to this embodiment operates in comparison with a wireless communications system 10A according to a comparative example. FIGS. 2 and 3 depict how the wireless communications system 10 according to this embodiment may be used. FIG. 4 depicts how the wireless communications system 10A according to a comparative example may be used.

Suppose, for example, a situation where the user 7, who is a salesperson or any other kind of employee at a store, attempts to read commodity information with the communications terminal 1 of this wireless communications system 10 while making an inventory management of a plurality of commodities 9 as shown in FIGS. 2 and 3. In that case, the user 7, who is standing in front of a display rack 90 on which a plurality of commodities 9 are displayed, operates the communications terminal 1 to make the communications terminal 1 read commodity information from all of those commodities 9 on the display rack 90, while holding the communications terminal 1 in his or her hand and pointing the communications terminal 1 toward the display rack 90. In such a situation, the communicable area 8 of the communications unit 13 of the communications terminal 1 is basically set toward the display rack 90. In this case, the communications terminal 1 may read commodity information from the communications partner terminals 2 (electronic tags) attached to those commodities 9 either sequentially on a one-by-one basis or all at a time.

First of all, it will be described how the wireless communications system 10A according to the comparative example shown in FIG. 4 operates. In the wireless communications system 10A, a fading phenomenon, causing a variation in the reception level of radio waves transmitted from the communications terminal 1, sometimes takes place due to, for example, interference of the radio waves resulting from reflection of the radio waves, thus producing a space in which communication loses its stability (i.e., a so-called "null spot") around the communications terminal 1. Then, if any communications partner terminal 2 is present in such a space around the communications terminal 1 where communication loses its stability, communication between the communications partner terminal 2 and the communications terminal 1 may be unable to be established successfully. Therefore, in the wireless communications system 10A according to the comparative example, the communications partner terminals 2 attached to some of the commodities 9 on the display rack 90 may fall within the null spot, thus possibly making communication between the communications terminal 1 and the communications partner terminals 2 unsuccessful as shown in FIG. 4. In FIG. 4, those commodities 9, from which the wireless communications system 10A has failed to read commodity information, are indicated by the crosses and designated by the reference sign 9X, while the other commodities 9, from which the wireless communications system 10A has read commodity information successfully, are designated by the reference sign 9Y.

In such a situation, the user's 7 waving his or her hand can certainly make a difference in the position, orientation, or any other parameter of the communications terminal 1 in a three-dimensional space. If this produces appropriate movement in the communications terminal 1, then the relative positional relationship between the communications partner terminal 2 attached to some commodity 9 and the communicable area 8 changes to the point of allowing the communications partner terminal 2 to get out of the null spot, thus increasing the success rate of communication between the communications partner terminal 2 and the communications terminal 1. Nevertheless, the effect of increasing the communication success rate will vary significantly according to how to move the communications terminal 1, i.e., according to the motion velocity, moving direction, route of movement, and other factors of the communications terminal 1. For example, if the movement of the communications terminal 1 is too little, then the relative positional relationship between the communications partner terminal 2 attached to the commodity 9 and the communicable area 8 may change insufficiently for the communications partner terminal 2 to get out of the null spot, thus possibly resulting in a failure in communication between the communications partner terminal 2 and the communications terminal 1. After all, in the wireless communications system 10A according to the comparative example, the success rate of communication between the communications partner terminal 2 and the communications terminal 1 varies too significantly according to the user's 7 skill in handling the communications terminal 1 to increase the success rate of communication with good stability.

In contrast, in the wireless communications system 10 according to this embodiment, the control unit 12 has the capability of varying the communicable area 8 according to at least the magnitude of movement, detected by the detection unit 11, of the communications terminal 1 as described above. In this embodiment, the control unit 12 may compare the magnitude of movement detected by the detection unit 11 with a threshold value, for example. On finding the magnitude of movement detected by the detection unit 11 greater than the threshold value, the control unit 12 fixes the communicable area 8. On the other hand, on finding the magnitude of movement of the communications terminal 1 equal to or less than the threshold value, the control unit 12 varies the communicable area 8.

Therefore, unless the user 7 who is holding the communications terminal 1 in his or her hand moves his or her hand in particular as shown in FIG. 2, the magnitude of the movement, detected by the detection unit 11, of the communications terminal 1 becomes equal to or less than the threshold value, and therefore, the communicable area 8 is varied by the control unit 12. That is to say, in the example illustrated in FIG. 2, the communications terminal 1 is in rest position and has no movement in itself, but the control unit 12 varying the communicable area 8, which is defined relatively to the communications terminal 1, changes the communicable area where the communications terminal 1 is able to communicate with the communications partner terminal 2. In the example illustrated in FIG. 2, the communicable area 8 varies in the three stages designated by the reference signs 8A, 8B, and 8C, respectively. The commodities 9 from which the communications terminal 1 has read commodity information successfully when the communicable area 8 is as designated by the reference sign 8A are designated by the reference sign 9A. Likewise, the commodities 9 from which the communications terminal 1 has read the commodity information successfully when the communicable area 8 is as designated by the reference sign 8B are designated by the reference sign 9B. The commodities 9 from which the communications terminal 1 has read the commodity information successfully when the communicable area 8 is as designated by the reference sign 8C are designated by the reference sign 9C.

As can be seen, in the example illustrated in FIG. 2, varying the communicable area 8 allows commodity information to be read from every commodity 9 on the display rack 90. In summary, even when the positional relationship between the housing 101 of the communications terminal 1 and the communications partner terminal 2 (including the orientation of either the housing 101 or the communications partner terminal 2) is fixed, varying the communicable area 8 makes a difference in relative positional relationship between the communicable area 8 and the communications partner terminal 2. This changes the relative positional relationship between the communications partner terminal 2 attached to the commodity 9 and the communicable area 8, thus allowing the communications partner terminal 2 to get out of the null spot and thereby increasing the success rate of communication between the communications partner terminal 2 and the communications terminal 1.

On the other hand, when the user 7 who is holding the communications terminal 1 in his or her hand moves his or her hand as shown in FIG. 3, the magnitude of movement, detected by the detection unit 11, of the communications terminal 1 becomes greater than the threshold value. Then, the control unit 12 fixes the communicable area 8. That is to say, in the example illustrated in FIG. 3, the communications terminal 1 itself has relatively significant movement, and therefore, the control unit 12 fixes the communicable area 8 that is defined relatively to the communications terminal 1, and the area where the communications terminal 1 is able to communicate with the communications partner terminal 2 does not vary. In FIG. 3, the communicable area 8 when the communications terminal 1 is located at its reference position indicated by the solid profile is designated by the reference sign 8A. The commodities 9 from which the communications terminal 1 has read the commodity information successfully when the communicable area 8 is as designated by the reference sign 8A are designated by the reference sign 9A. The communicable area 8 when the communications terminal 1 has moved in the direction indicated by the arrow B from the reference position is designated by the reference sign 8B. The communicable area 8 when the communications terminal 1 has moved in the direction indicated by the arrow C from the reference position is designated by the reference sign 8C. The commodities 9 from which the communications terminal 1 has read the commodity information successfully when the communicable area 8 is as designated by the reference sign 8B are designated by the reference sign 9B. The commodities 9 from which the communications terminal 1 has read the commodity information successfully when the communicable area 8 is as designated by the reference sign 8C are designated by the reference sign 9C.

As can be seen, in the example illustrated in FIG. 3, moving the communications terminal 1 allows commodity information to be read from every commodity 9 on the display rack 90. In summary, even when the area where the communications terminal 1 is able to communicate with the communications partner terminal 2 (i.e., the communicable area 8) is fixed, shifting the communicable area 8 along with the communications terminal 1 makes a difference in relative positional relationship between the communicable area 8 and the communications partner terminal 2. This changes the relative positional relationship between the communications partner terminal 2 attached to the commodity 9 and the communicable area 8, thus allowing the communications partner terminal 2 to get out of the null spot and thereby increasing the success rate of communication between the communications partner terminal 2 and the communications terminal 1.

As can be seen from the foregoing description, in the wireless communications system 10 according to this embodiment, the communicable area 8 varies according to at least the magnitude of movement, detected by the detection unit 11, of the communications terminal 1, thus increasing the success rate of communication between the communications partner terminal 2 and the communications terminal 1. That is to say, the relative positional relationship between the communications partner terminal 2 and the communicable area 8 is changed by varying the communicable area 8 when the communications terminal 1 has no movement or by shifting the communicable area 8 along with the communications terminal 1 when the communications terminal 1 has some movement. This allows the relative positional relationship between the communications partner terminal 2 and the communicable area 8 to be changed appropriately, no matter whether the communications terminal 1 is moving or not. Thus, the wireless communications system 10 according to this embodiment allows the success rate of communication between the communications partner terminal 2 and the communications terminal 1 to be increased with good stability, irrespective of the user's 7 skill at handling the communications terminal 1.

Figure 5:
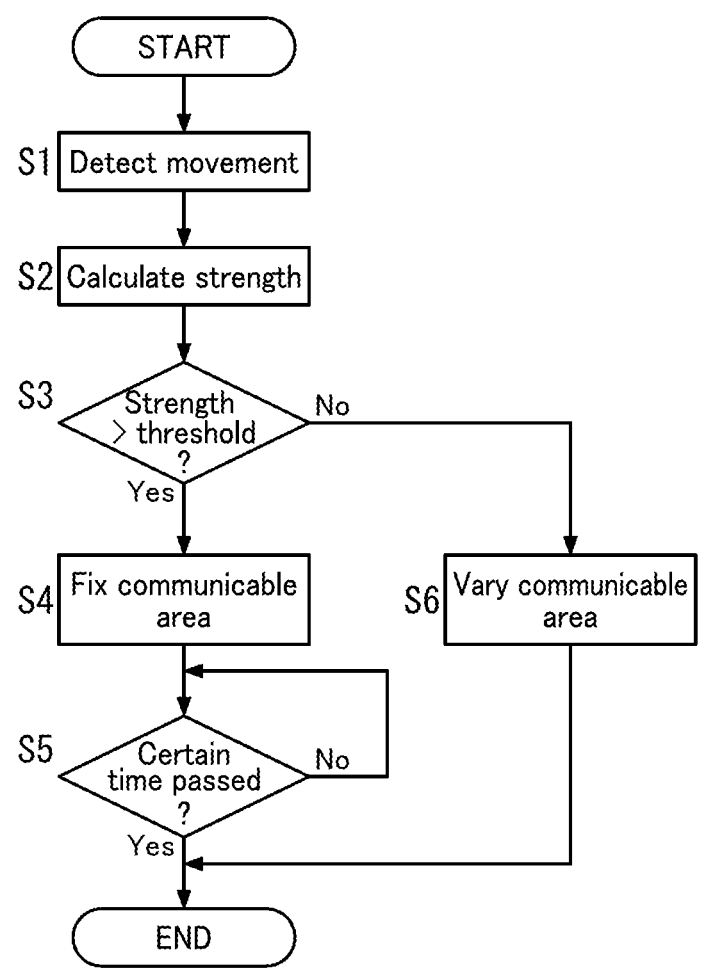
FIG. 5 is a flowchart showing an exemplary procedure of operation of the wireless communications system according to the first embodiment.

FIG. 5 is a flowchart illustrating an exemplary operation of the wireless communications system 10 according to this embodiment. The series of processing steps in the flowchart shown in FIG. 5 corresponds to a method for controlling the communications terminal 1.

First, the wireless communications system 10 makes the detection unit 11 detect any movement of the communications terminal 1 (in Step S1). Next, the control unit 12 calculates, based on the result of detection by the detection unit 11, a strength indicating the magnitude of movement of the communications terminal 1 (in Step S2). As used herein, the "strength" is a value indicating the management of movement of the communications terminal 1. Specifically, the strength is equal to zero when the communications terminal 1 is in rest position, but increases as the magnitude of movement of the communications terminal 1 increases.

Figure 6:
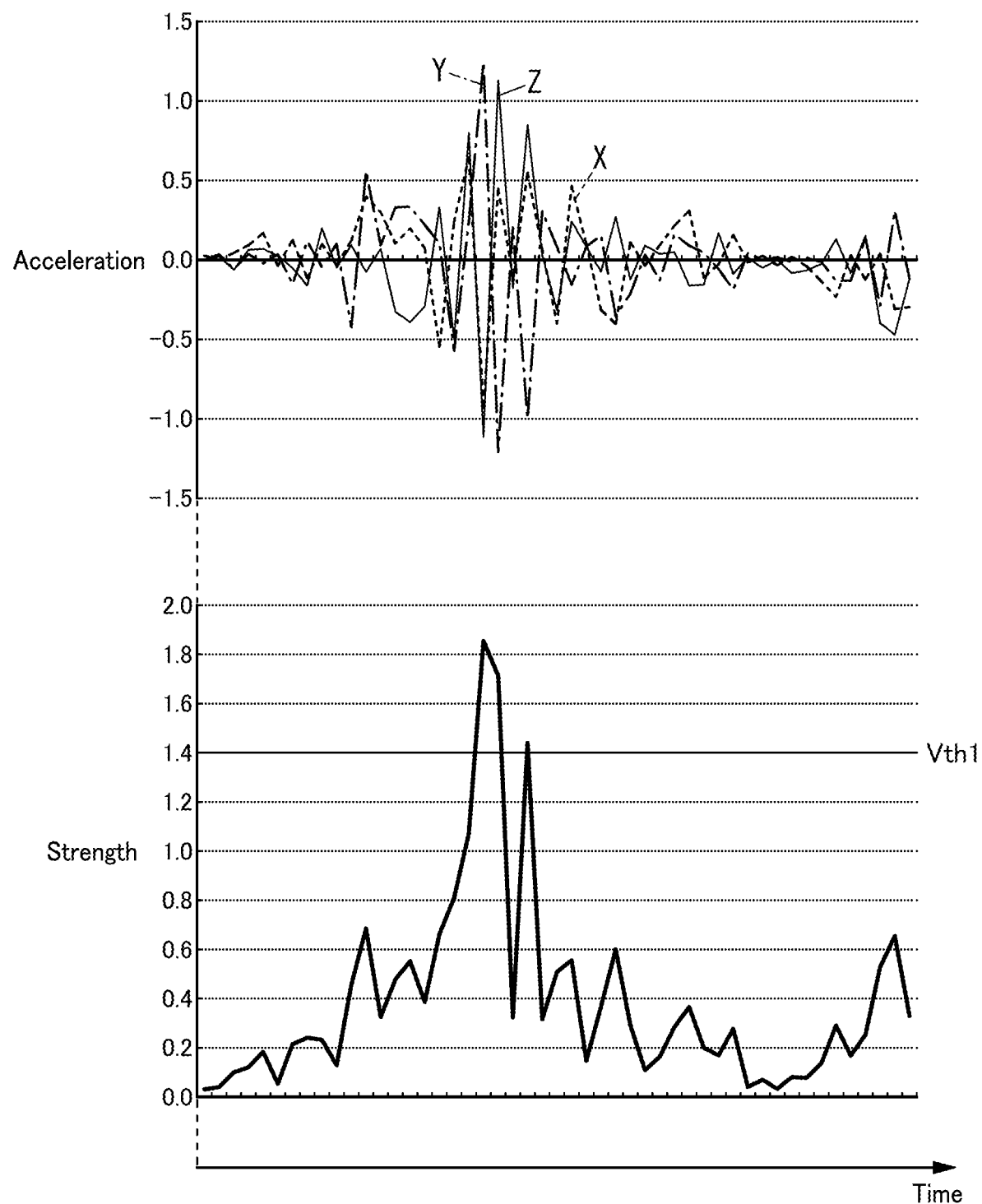
FIG. 6 is a graph showing the acceleration in X-, Y-, and Z-axis directions of the wireless communications system at the top and the strength thereof at the bottom.

In this embodiment, the strength may be calculated based on the magnitudes of acceleration in X-, Y-, and Z-axis directions detected by the acceleration sensor 111 as shown in FIG. 6. FIG. 6 illustrates a graph showing the acceleration in the X-, Y-, and Z-axis directions at the top and the strength thereof at the bottom with respect to the time as the abscissa. In FIG. 6, the acceleration plots in the X-, Y-, and Z-axis directions are designated by X, Y, and Z, respectively. In the example illustrated in FIG. 6, the strength is represented by the root of the squared sum of the magnitudes of acceleration in the X-, and Z-axis directions. Specifically, the control unit 12 calculates the squares of the magnitudes of acceleration in the X-, Y-, and Z-axis directions, adds the squares together, and then calculates the root of the sum of the squares, thereby obtaining the strength.

The control unit 12 compares the strength thus calculated with a threshold value (in Step S3). In the example illustrated in FIG. 6, the threshold value Vth1 is set at 1.4. When finding the strength greater than the threshold value (if the answer is YES in Step S3), the control unit 12 fixes the communicable area 8 (in Step S4). Thus, shifting the communicable area 8 along with the communications terminal 1 as in the example illustrated in FIG. 3 described above makes a difference in the relative positional relationship between the communicable area 8 and the communications partner terminal 2.

In this embodiment, if the control unit 12 fixes the communicable area 8, the control unit 12 keeps time to determine whether or not a certain amount of time has passed (in Step S5) such that the communicable area 8 is fixed for at least the certain amount of time (of e.g., a few seconds). That is to say, when finding that the certain amount of time has passed since the communicable area 8 started to be fixed (if the answer is YES in Step S5), the control unit 12 ends the series of processing steps.

On the other hand, when finding the strength not greater than the threshold value (i.e., equal to or less than the threshold value) (if the answer is NO in Step S3), the control unit 12 varies the communicable area 8 (in Step S6). Thus, varying the communicable area 8 as in the example illustrated in FIG. 2 described above makes a difference in the relative positional relationship between the communicable area 8 and the communications partner terminal 2. In that case, the control unit 12 ends the series of processing steps without waiting for the certain amount of time to pass.

The wireless communications system 10 according to this embodiment repeatedly performs this series of processing steps S1-S6. Note that the order of the processing steps S1-S6 shown in FIG. 5 is only an example and may be changed appropriately as well.

(3.2) Variation Patterns of Communicable Area

Next, it will be described with reference to FIGS. 7-11 in what patterns the communicable area 8 varies according to the magnitude of movement, detected by the detection unit 11, of the communications terminal 1. In this embodiment, the area adjustment unit 14 varies the communicable area 8 by changing the radio wave directivity of the communications unit 13 as described above. Thus, in the following description, the variation patterns of the communicable area 8 will be described in terms of variation patterns of the radio wave directivity. FIGS. 7-10 are graphs each showing the strength indicating the management of movement of the communications terminal 1 at the top and the directivity at the bottom with respect to the time as the abscissa.

(3.2.1) First Example

Figure 7:
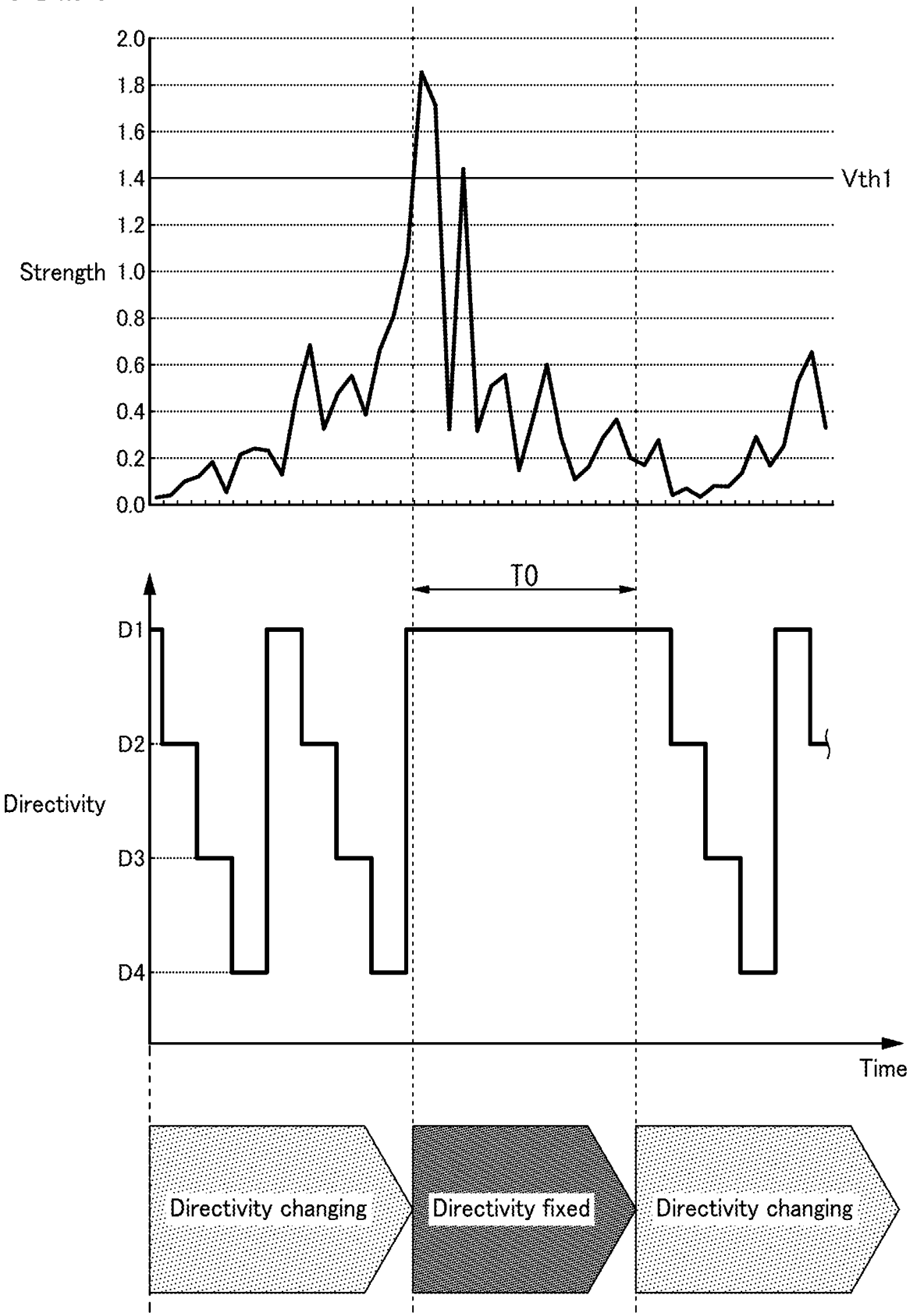
FIG. 7 illustrates a first exemplary variation pattern of the communicable area of the wireless communications system.

In a first example, until the strength exceeds a threshold value Vth1, the control unit 12 operates in a "directivity changing" operation mode and changes the directivity in four stages D1, D2, D3, and D4, thereby varying the communicable area 8 as shown in FIG. 7. In this case, the control unit 12 changes the directivity at regular switching intervals in the order of D1, D2, D3, D4, D1, D2, and so on.

Meanwhile, once the strength has exceeded the threshold value Vth1, the control unit 12 fixes the directivity. Specifically, the control unit 12 operates in a "directivity fixed" operation mode and fixes the directivity for a certain amount of time T0 from a point in time when the strength exceeds the threshold value Vth1. In this case, the directivity is fixed at a directivity value (e.g., D1 in the example shown in FIG. 7) when the strength becomes greater than the threshold value Vth1. Thereafter, when the certain amount of time T0 passes, the control unit 12 compares the strength with the threshold value Vth1 once again. When finding the strength not greater than the threshold value Vth1, the control unit 12 changes the directivity. In this example, the directivity is fixed at the directivity value when the strength exceeds the threshold value Vth1. However, this is only an example and should not be construed as limiting. Alternatively, the directivity may also be fixed at a particular directivity value selected from the group consisting of D1, D2, D3, and D4.

(3.2.2) Second Example

Figure 8:
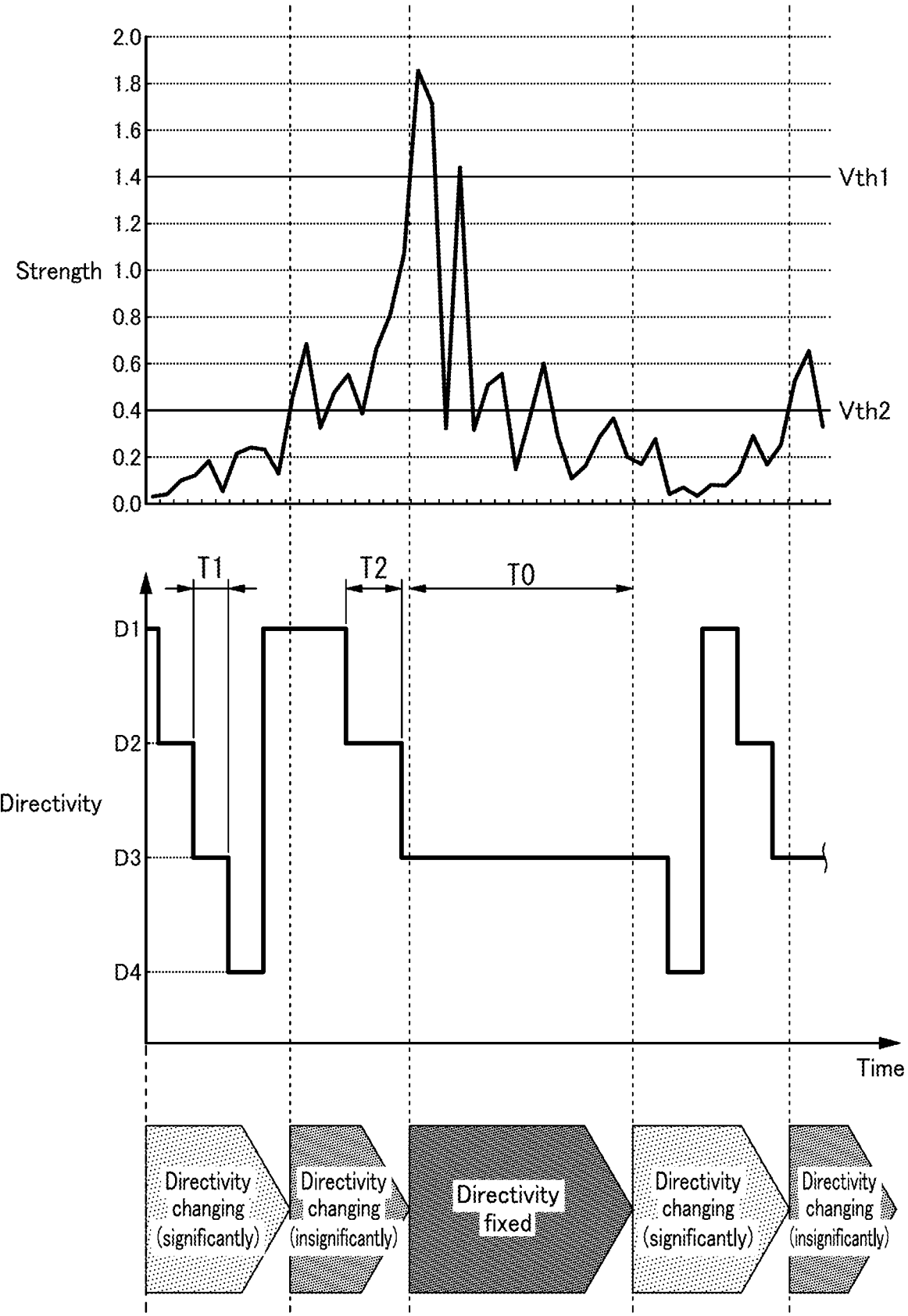
FIG. 8 illustrates a second exemplary variation pattern of the communicable area of the wireless communications system.

In a second example, the control unit 12 increases a variation in the communicable area 8 as the magnitude of the movement detected by the detection unit 11 decreases as shown in FIG. 8, which is a major difference from the first example described above. In other words, the control unit 12 determines the variation in the communicable area 8 according to the magnitude of movement of the communications terminal 1 such that as the magnitude of movement of the communications terminal 1 decreases, the variation in the communicable area 8 increases. Stated otherwise, the control unit 12 determines the variation in the communicable area 8 such that as the magnitude of movement of the communications terminal 1 increases, the variation in the communicable area 8 decreases. As used herein, the "variation" includes zero. If the variation in the communicable area 8 is zero, then the communicable area 8 defined relatively to the communications terminal 1 does not vary but is fixed.

Therefore, if the magnitude of movement detected by the detection unit 11 is greater than the threshold value, the control unit 12 sets the variation in the communicable area 8 at zero to fix the communicable area 8 as described above. That is to say, when the magnitude of movement detected by the detection unit 11 is large enough to exceed the threshold value, the communicable area 8 defined relatively to the communications terminal 1, i.e., the area where the communications terminal 1 is able to communicate with the communications partner terminal 2, is fixed.

Specifically, in the second example, a first threshold value Vth1 and a second threshold value Vth2 are set as the threshold values as shown in FIG. 8, and the control unit 12 varies the communicable area 8 based on the results of comparison of the strength with the first threshold value Vth1 and the second threshold value Vth2. In this case, the second threshold value Vth2 is smaller than the first threshold value Vth1. That is to say, until the strength exceeds the second threshold value Vth2, the control unit 12 varies the communicable area 8 by changing the directivity in the four stages D1, D2, D3, and D4. In this period, the control unit 12 operates in a "directivity changing (significantly)" operation mode, and changes the directivity at regular switching intervals T1 in the order of D1, D2, D3, D4, D1, D2, and so on.

Meanwhile, once the strength has exceeded the second threshold value Vth2 (<Vth1), the control unit 12 decreases the frequency of occurrence of the variation per unit time in the communicable area 8 by extending the directivity switching interval. That is to say, as the magnitude of movement of the communications terminal 1 increases, the control unit 12 reduces the variation in the communicable area 8 by decreasing the rate of variation in the communicable area 8. Specifically, once the strength has exceeded the second threshold value Vth2, the control unit 12 operates in a "directivity changing (insignificantly)" operation mode, and changes the directivity at second switching intervals T2 (which are longer the first switching interval T1) in the order of D1, D2, D3, D4, D1, D2, and so on. In this case, once the strength has exceeded the second threshold value Vth2, the control unit 12 will change the directivity at the second switching intervals T2 either until the certain amount of time T0 passes or until the strength exceeds the first threshold value Vth1.

In other words, the variation in the communicable area 8 includes the frequency of occurrence of the variation per unit time in the communicable area 8. Also, in the second example, as the magnitude of movement of the communications terminal 1 increases, the control unit 12 changes the directivity switching interval from the first switching interval T1 into the second switching interval T2, thus decreasing the frequency of occurrence of the variation per unit time in the communicable area 8. This reduces the variation in the communicable area 8.

Also, when the strength exceeds the first threshold value Vth1 (>Vth2), the control unit 12 further reduces the variation in the communicable area 8. Then, the control unit 12 operates in a "directivity fixed" operation mode and fixes the directivity such that the variation in the communicable area 8 (i.e., the frequency of occurrence of the variation per unit time) becomes equal to zero. Specifically, the control unit 12 fixes the directivity for a certain amount of time T0 from a point in time when the strength exceeds the first threshold value Vth1. In this example, the directivity is fixed at a directivity value (e.g., D3 in the example shown in FIG. 8) when the strength becomes greater than the first threshold value Vth1. However, this is only an example and should not be construed as limiting. Alternatively, the directivity may also be fixed at a particular directivity value selected from the group consisting of D1, D2, D3, and D4. Thereafter, when the certain amount of time T0 passes, the control unit 12 compares the strength with each of the threshold values Vth1 and Vth2 once again to determine the operation mode.

(3.2.3) Third Example

Figure 9:
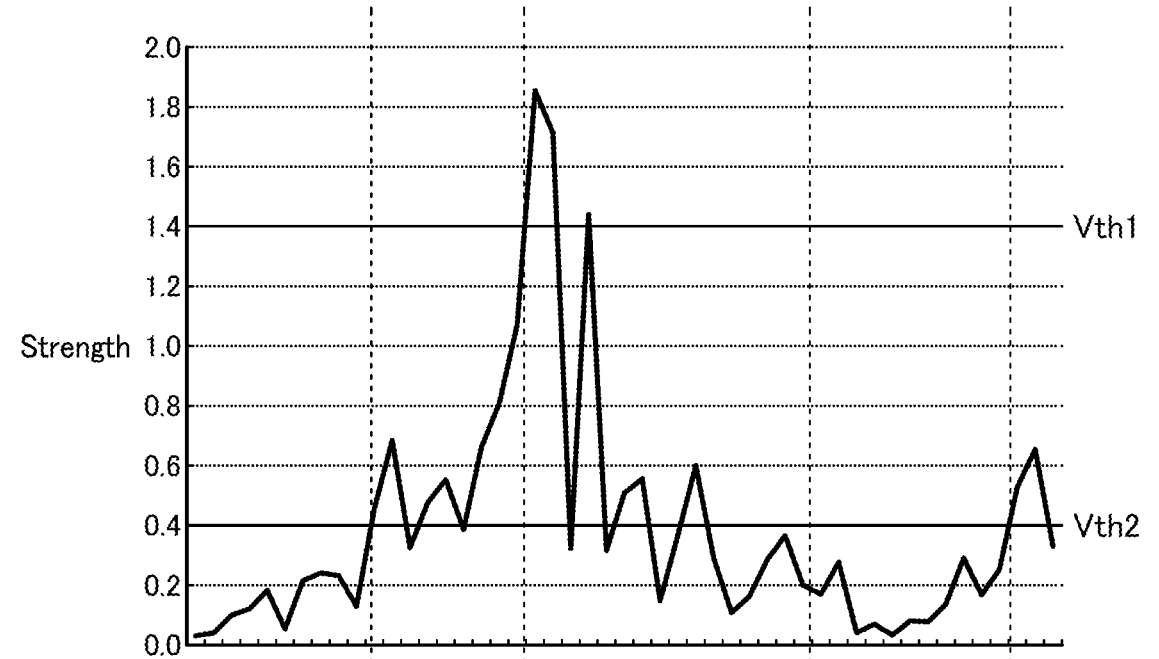
FIG. 9 illustrates a third exemplary variation pattern of the communicable area of the wireless communications system.
Figure 9:
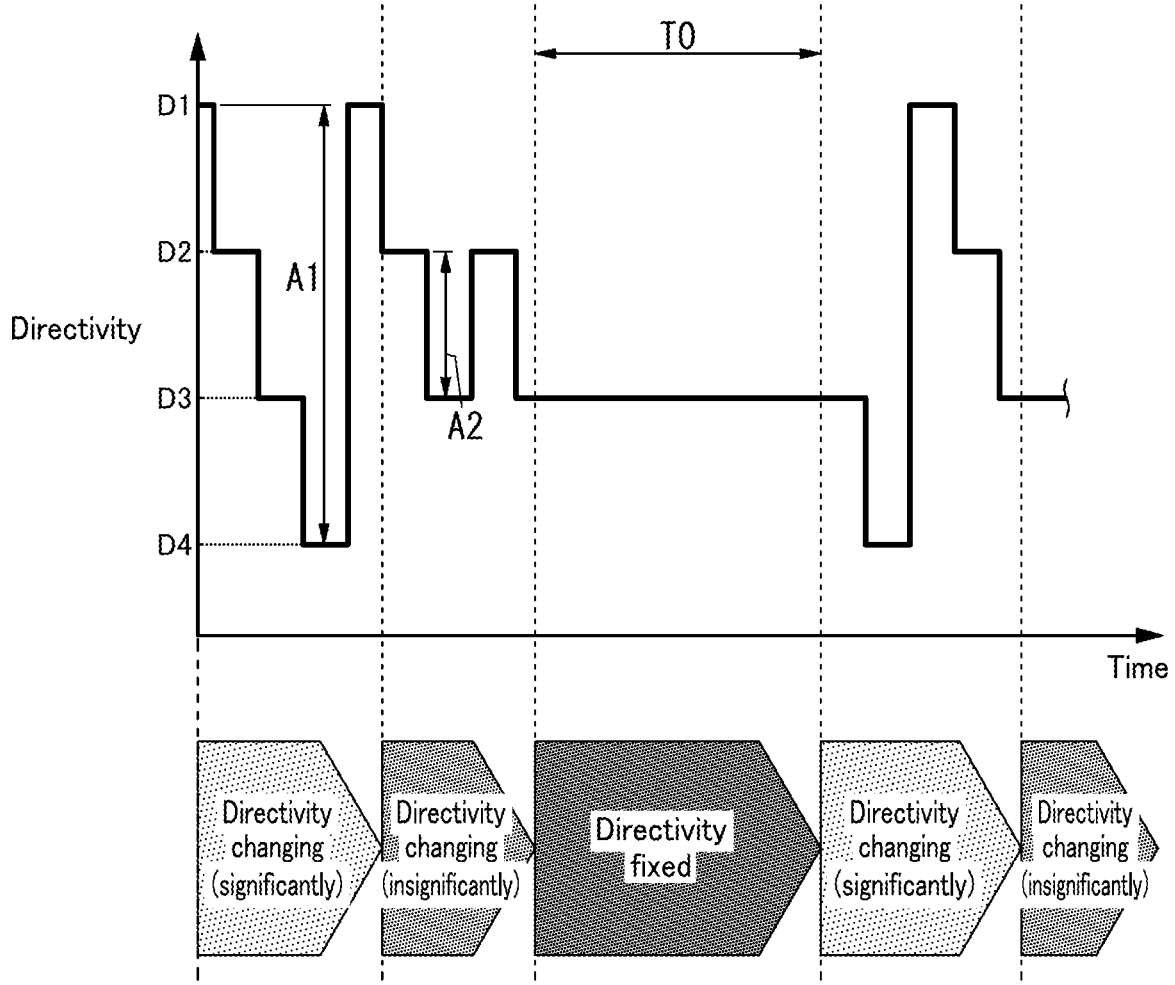

In a third example, the variation in the communicable area 8 includes the amplitude of the variation per unit time in the communicable area 8 as shown in FIG. 9, which is a major difference from the second example described above. Also, in this third example, as the magnitude of movement of the communications terminal 1 increases, the control unit 12 changes the amplitude of change in directivity from a first amplitude A1 into a second amplitude A2, which is smaller than the first amplitude A1, thus reducing the amplitude of the variation per unit time in the communicable area 8. This reduces the variation in the communicable area 8.

Specifically, in the third example, the first threshold value Vth1 and the second threshold value Vth2 (<Vth1) are set as the threshold values as shown in FIG. 9, and the control unit 12 varies the communicable area 8 based on the results of comparison of the strength with each of the first threshold value Vth1 and the second threshold value Vth2. Specifically, until the strength exceeds the second threshold value Vth2, the control unit 12 operates in a "directivity changing (significantly)" operation mode, and changes the directivity in the four stages D1, D2, D3, and D4, thus varying the communicable area 8. In this period, the control unit 12 changes the directivity at regular switching intervals in the order of D1, D2, D3, D4, D1, D2, and so on.

Meanwhile, once the strength has exceeded the second threshold value Vth2 (<Vth1), the control unit 12 decreases the amplitude of the variation per unit time in the communicable area 8 by reducing the number of directivity switching stages. That is to say, as the magnitude of movement of the communications terminal 1 increases, the control unit 12 reduces the variation in the communicable area 8 by decreasing the amplitude of variation in the communicable area 8. Specifically, once the strength has exceeded the second threshold value Vth2, the control unit 12 operates in a "directivity changing (insignificantly)" operation mode, and changes the directivity in two stages D2 and D3, thus varying the communicable area 8. In this case, the control unit 12 changes at regular switching intervals the directivity in the order of D2, D3, D2, D3, D2, and so on. Thus, changing the amplitude of change in directivity from the first amplitude A1 into the second amplitude A2 (<A1) causes a decrease in the amplitude of variation per unit time in the communicable area 8. In this case, once the strength has exceeded the second threshold value Vth2, the control unit 12 will change the directivity in the two stages either until the certain amount of time T0 passes or until the strength exceeds the first threshold value Vth1.

Also, when the strength exceeds the first threshold value Vth1 (>Vth2), the control unit 12 further reduces the variation in the communicable area 8. Then, the control unit 12 operates in a "directivity fixed" operation mode and fixes the directivity such that the variation in the communicable area 8 (i.e., the amplitude of the variation per unit time) becomes equal to zero. Specifically, the control unit 12 fixes the directivity for a certain amount of time T0 from a point in time when the strength exceeds the first threshold value Vth1. In this example, the directivity is fixed at a directivity value (e.g., D3 in the example shown in FIG. 9) when the strength becomes greater than the first threshold value Vth1. However, this is only an example and should not be construed as limiting. Alternatively, the directivity may also be fixed at a particular directivity value selected from the group consisting of D1, D2, D3, and D4. Thereafter, when the certain amount of time T0 passes, the control unit 12 compares the strength with each of the threshold values Vth1 and Vth2 once again to determine the operation mode.

Optionally, the variation in the communicable area 8 may include both the frequency of occurrence of the variation per unit time in the communicable area 8 and the amplitude of the variation per unit time in the communicable area 8. In that case, the second example and third example described above are adopted in combination.

(3.2.4) Fourth Example

Figure 10:
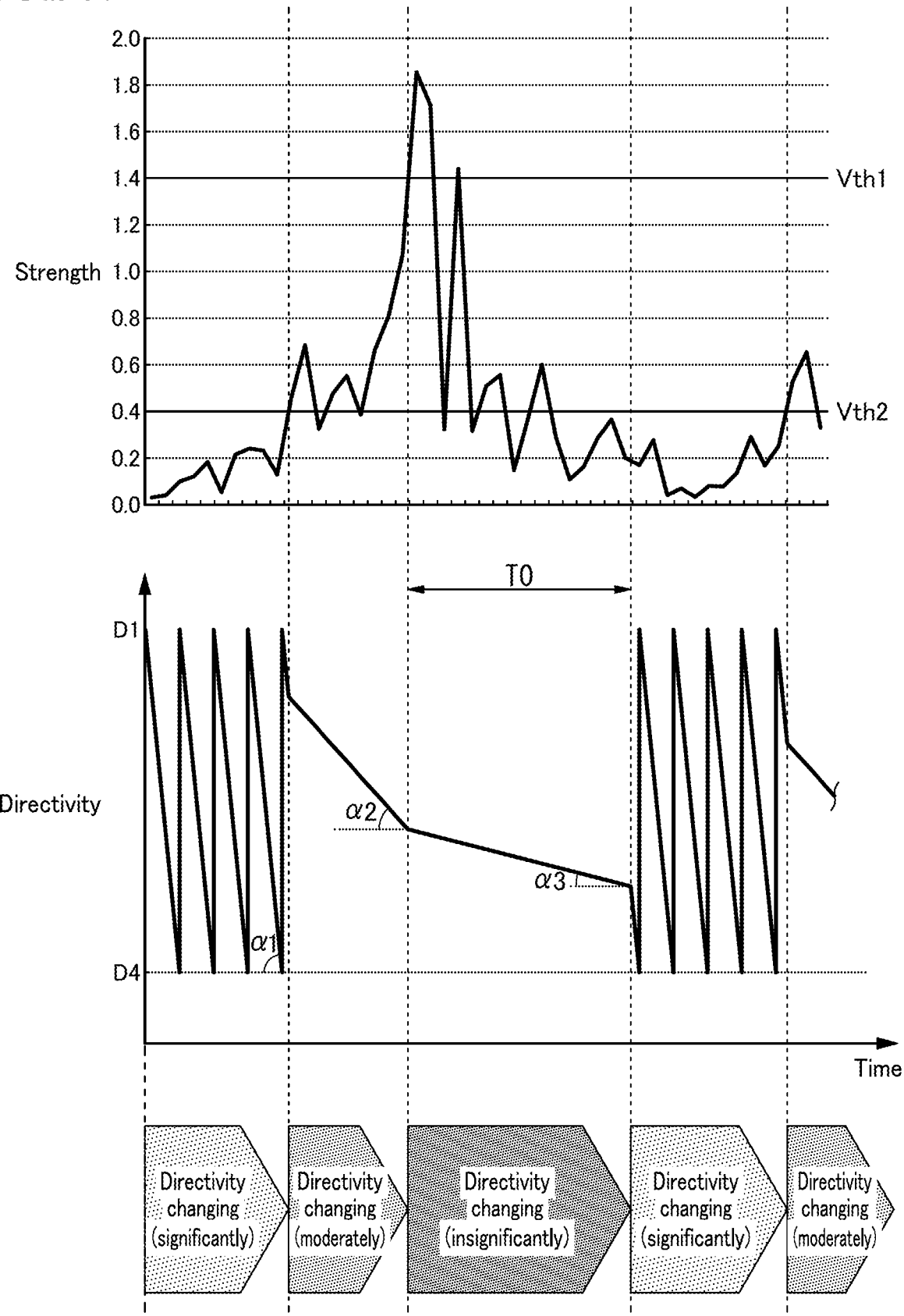
FIG. 10 illustrates a fourth exemplary variation pattern of the communicable area of the wireless communications system.

In a fourth example, the communicable area 8 varies continuously as shown in FIG. 10, which is a major difference from the second example. That is to say, in this fourth example, the directivity changes continuously between D1 and D4, instead of changing stepwise (discontinuously).

Specifically, in the fourth example, the first threshold value Vth1 and the second threshold value Vth2 (<Vth1) are set as the threshold values as shown in FIG. 10, and the control unit 12 varies the communicable area 8 based on the results of comparison of the strength with each of the first threshold value Vth1 and the second threshold value Vth2. Specifically, until the strength exceeds the second threshold value Vth2, the control unit 12 operates in a "directivity changing (significantly)" operation mode, and changes the directivity continuously between D1 and D4, thus varying the communicable area 8. In this period, the control unit 12 changes the directivity at a relatively steep gradient α1 with respect to the time axis.

Meanwhile, once the strength has exceeded the second threshold value Vth2 (<Vth1), the control unit 12 decreases the amplitude of the variation per unit time in the communicable area 8 by making the gradient of the directivity less steep with respect to the time axis. Specifically, once the strength has exceeded the second threshold value Vth2, the control unit 12 operates in a "directivity changing (moderately)" operation mode, and changes the gradient of the directivity with respect to the time axis from α1 into α2 (where α1>α2). This changes the rate of change in directivity, thus causing a decrease in the amplitude of variation per unit time in the communicable area 8. In this case, once the strength has exceeded the second threshold value Vth2, the control unit 12 will change the directivity at the gradient α2 either until the certain amount of time T0 passes or until the strength exceeds the first threshold value Vth1.

Also, when the strength exceeds the first threshold value Vth1 (>Vth2), the control unit 12 further reduces the variation in the communicable area 8. Then, the control unit 12 operates in a "directivity changing (insignificantly)" operation mode and changes the gradient of the directivity with respect to the time axis from α2 into α3 (where α2>α3). This changes the rate of change in directivity, thus causing a further decrease in the amplitude of variation per unit time in the communicable area 8. Specifically, the control unit 12 changes the directivity at the gradient α3 for a certain amount of time T0 from a point in time when the strength exceeds the first threshold value Vth1. Thereafter, when the certain amount of time T0 passes, the control unit 12 compares the strength with each of the threshold values Vth1 and Vth2 once again to determine the operation mode.

(4) Variations

The first embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the wireless communications system 10 may be implemented as a method for controlling the communications terminal 1, a (computer) program, or a non-transitory storage medium that stores the program thereon. A method for controlling a communications terminal 1 according to an aspect is a method for controlling a communications terminal 1 including a communications unit 13 configured to communicate wirelessly with a communications partner terminal 2. The method includes varying a communicable area 8 of the communications unit 13 according to at least magnitude of movement of the communications terminal 1. The communicable area 8 is defined relatively to the communications terminal 1. Optionally, any of the variations to be described below may be adopted in combination as appropriate.

(4.1) First Variation

In a wireless communications system 10 according to a first variation of the first embodiment, the control unit 12 varies the communicable area 8 with not only the magnitude of movement of the communications terminal 1 but also the direction of movement of the communications terminal 1 taken into account.

Figure 11:
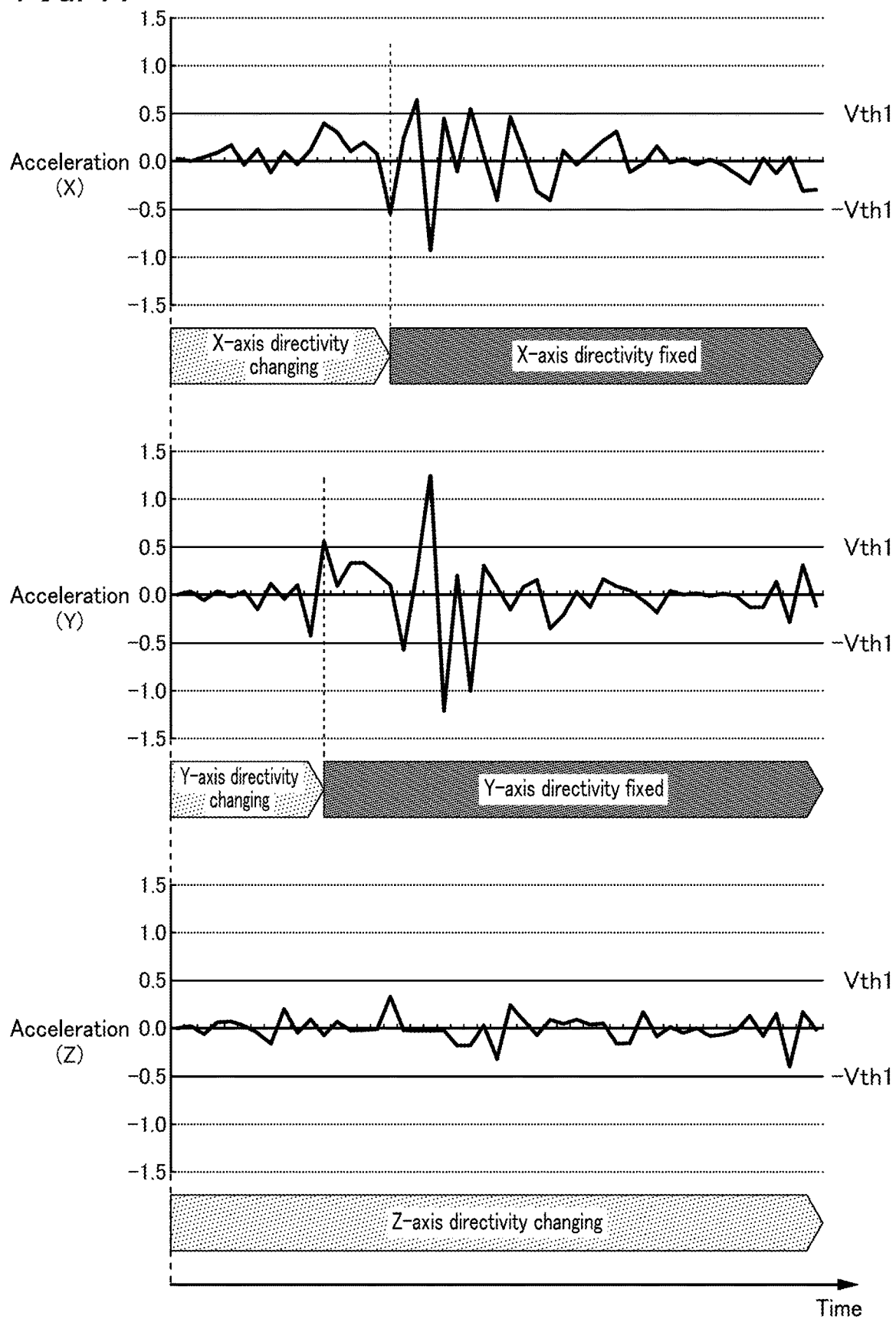
FIG. 11 illustrates how a wireless communications system according to a first variation of the first embodiment operates.

In this case, the control unit 12 may determine, for example, the variations of the communicable area 8 in the X-, Y-, and Z-axis directions in accordance with the magnitudes of acceleration detected in the X-, Y-, and Z-axis directions by the acceleration sensor 111 as shown in FIG. 11. FIG. 11 is a graph showing, top to bottom, the acceleration detected in the X-, Y-, and Z-axis directions, respectively, by the acceleration sensor 111 with respect to the time axis as the abscissa.

Specifically, the control unit 12 compares the magnitudes of acceleration in the X-, Y-, and Z-axis directions with the threshold value Vth1. In this case, the acceleration is detected as either a positive value or a negative value with respect to 0.0 as a reference value. Thus, when the magnitude (absolute value) of the acceleration exceeds the threshold value Vth1, the acceleration becomes either a value larger than the positive threshold value Vth1 or a value smaller than the negative threshold value −Vth1.

Then, the control unit 12 varies the communicable area 8 on an individual basis in each of the X-, Y-, and Z-axis directions. Specifically, if the magnitude of acceleration in the X-axis direction is equal to or less than the threshold value Vth1, the control unit 12 changes the radio wave directivity of the communications unit 13 one-dimensionally along the X axis, thus shifting the communicable area 8 linearly along the X axis. Likewise, if the magnitude of acceleration in the Y-axis direction is equal to or less than the threshold value Vth1, the control unit 12 changes the directivity one-dimensionally along the Y axis. If the magnitude of acceleration in the Z-axis direction is equal to or less than the threshold value Vth1, the control unit 12 changes the directivity one-dimensionally along the Z axis. In the example illustrated in FIG. 11, the acceleration in each of the X- and Y-axis directions is greater than the threshold value Vth1, and therefore, the directivity is fixed in each of the X- and Y-axis directions. On the other hand, the acceleration in the Z-axis direction is equal to or less than the threshold value Vth1, and therefore, the directivity is not fixed in the Z-axis direction.

(4.2) Second Variation

In a wireless communications system 10 according to a second variation of the first embodiment, the control unit 12 determines, based on the angular velocity detected by an angular velocity sensor 112, the magnitude of movement of the communications terminal 1.

Figure 12:
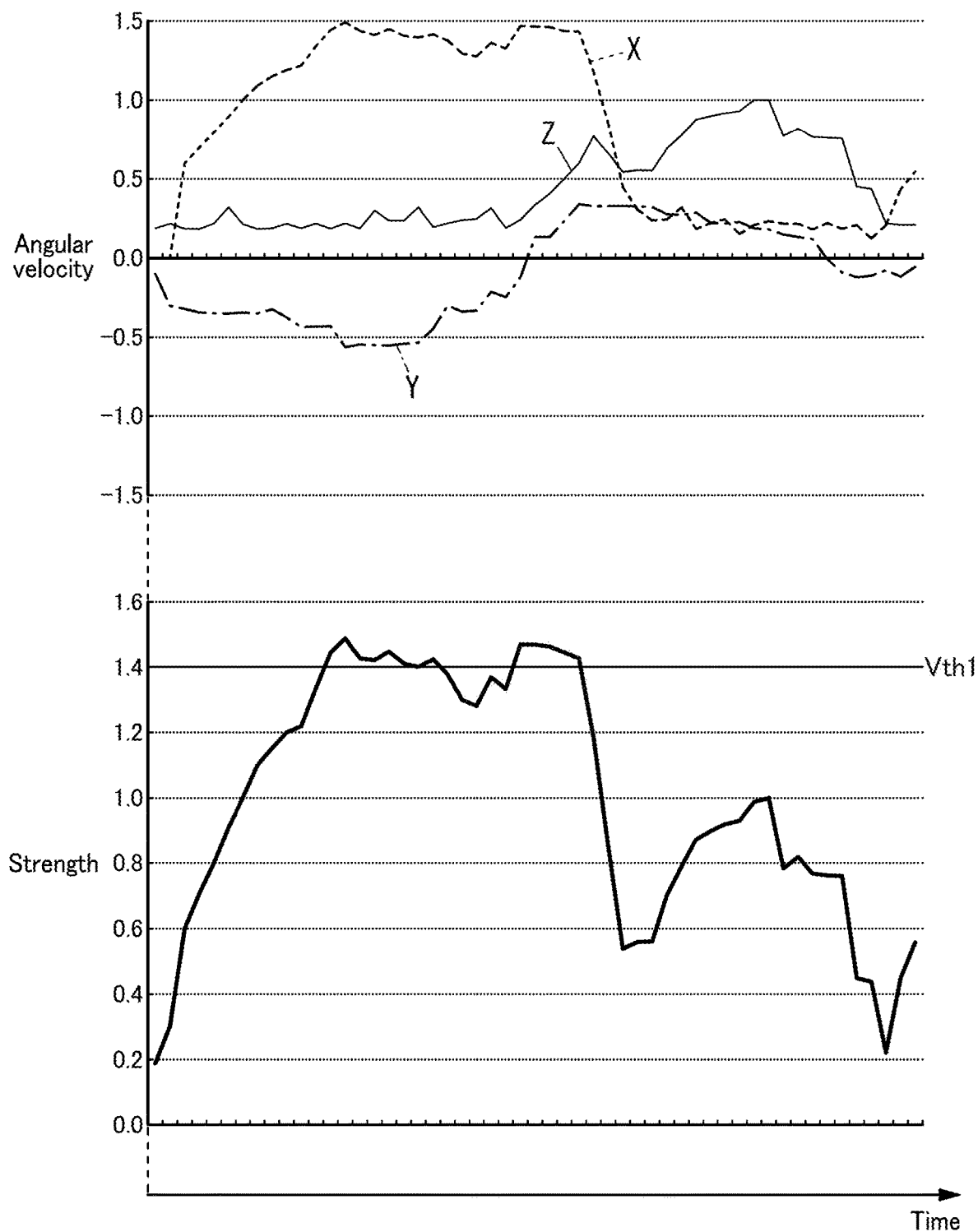
FIG. 12 is a graph showing angular velocities around X-, Y-, and Z-axes of a wireless communications system according to a second variation of the first embodiment at the top and the strength thereof at the bottom.

Specifically, in this variation, the strength is calculated based on the magnitudes of angular velocities detected around the X-, Y-, and Z-axes by the angular velocity sensor 112 as shown in FIG. 12. FIG. 12 is a graph showing the angular velocities around the X-, Y-, and Z-axes at the top and the strength at the bottom with respect to the time axis as the abscissa. In FIG. 12, the plots indicating the angular velocities around the X-, Y-, and Z-axes are designated by X, Y, and Z, respectively. In the example illustrated in FIG. 12, the strength is represented by the maximum one among the absolute values of the angular velocities around the X-, Y-, and Z-axes. That is to say, the control unit 12 compares the absolute values of the angular velocities around the X-, Y-, and Z-axes with each other and finds the maximum one of these three absolute values, thereby determining the strength.

(4.3) Other Variations

Next, variations, other than the first and second variations described above, of the first embodiment will be enumerated one after another.

The wireless communications system 10 according to the present disclosure includes a computer system in its control unit 12, for example. In that case, the computer system may include, as principal hardware components, a processor and a memory. The function of the wireless communications system 10 according to the present disclosure may be performed by making the processor execute the program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

Also, the plurality of functions of the wireless communications system 10 do not have to be aggregated together in a single housing 101. Rather, the respective constituent elements of the wireless communications system 10 may be distributed in multiple housings. For example, in the first embodiment described above, the detection unit 11 and the control unit 12 are provided in the housing 101 of the communications terminal 1. However, this is only an example and should not be construed as limiting. Alternatively, at least one of the detection unit 11 or the control unit 12 may be provided in a different housing from the communications terminal 1. Optionally, at least some of the functions of the wireless communications system 10 may be performed by a server and cloud computing system, for example. Conversely, the functions distributed in multiple devices of the wireless communications system 10 in the first embodiment may be aggregated together in a single housing.

In the first embodiment described above, the communicable area 8 is varied by changing the radio wave directivity of the communications unit 13. However, this is not the only parameter for varying the communicable area 8. Alternatively, the control unit 12 may also vary the communicable area 8 by changing at least one alternative parameter selected from the group consisting of the transmission strength of the communication medium used by the communications unit 13 to communicate the communications partner terminal 2 and reception sensitivity of the communication medium. Still alternatively, the control unit 12 may also vary the communicable area 8 by changing the channel (frequency band), modulation method, or polarization plane of the communications unit 13. For example, if the channel is changed, then radio waves will be reflected and interfere with each other differently, thus eventually varying the communicable area 8. In that case, if the channel switching interval is shortened per unit time, the frequency of occurrence (or magnitude) of the variation per unit time in communicable area 8 increases. Also, if the number of channels to switch increases per unit time, then the amplitude of the variation per unit time in communicable area 8 also increases.

In the embodiment described above, the detection unit 11 detects the movement of the communications terminal 1 based on the acceleration or angular velocity applied to the communications terminal 1. However, this is only an example and should not be construed as limiting. Alternatively, the detection unit 11 may also detect the movement of the communications terminal 1 either based on the motion velocity of the communications terminal 1 or simply by determining whether or not the communications terminal 1 is moving at all. Furthermore, if the detection unit 11 is provided separately from the housing 101 of the communications terminal 1, the detection unit 11 may also be configured to detect the movement of the communications terminal 1 based on an image of the communications terminal 1, which is captured by, and received from, an image capture device outside of the communications terminal 1.

Furthermore, in the embodiment described above, the wireless communications system 10 is introduced into a convenience store. However, this is only an exemplary application of the wireless communications system 10. Alternatively, the wireless communications system 10 may be introduced into any type of store other than convenience stores. Furthermore, in the embodiment described above, the wireless communications system 10 is used to make inventory management and inspection of commodities on a display rack. Optionally, the wireless communications system 10 may also be used to read commodity information from a commodity 9 that the user has purchased from a store. Still alternatively, the wireless communications system 10 may also be used to make inventory management and inspection in not just stores but also warehouses, factories, customs, and various other types of facilities as well.

Furthermore, the information exchanged via wireless communication between the communications terminal 1 and the communications partner terminal 2 does not have to be commodity information but may also be information to identify any items other than commodities 9, image data, or audio data as well.

Furthermore, the communications partner terminal 2 does not have to be a passive RF tag but may also be an active RF tag as well. Also, the communications partner terminal 2 may also be any type of terminal with the ability to communicate with the communications terminal 1 and may also be a terminal other than mobile telecommunications devices and electronic tags (RF tags).

Furthermore, the communications terminal 1 does not have to be a device for receiving commodity information and other kinds of information from the communications partner terminal 2 but may also be, for example, a device for transmitting information to the communications partner terminal 2 or a device for transmitting and receiving information to/from the communications partner terminal 2 (i.e., a device for making bidirectional communication).

Furthermore, the wireless communication between the communications terminal 1 and the communications partner terminal 2 does not have to be established by the method using radio waves as a communication medium but may also be established by a method using light as a communication medium.

Furthermore, in the foregoing description of the first embodiment, if one of two values being compared with each other is "greater than" the other, this phrase may herein refer to a situation where one of the two values is over the other. However, this should not be construed as limiting. Alternatively, the phrase "greater than" may also be a synonym of the phrase "equal to or greater than" that covers not only a situation where one of the two values is over the other but also a situation where these two values are equal to each other. That is to say, it is arbitrarily changeable, depending on selection of the threshold value or any preset value, whether or not the phrase "greater than" covers the situation where the two values are equal to each other. Therefore, from a technical point of view, there is no difference between the phrase "greater than" and the phrase "equal to or greater than." Similarly, the phrase "equal to or less than" may be a synonym of the phrase "less than" as well.

Second Embodiment

A wireless communications system 10 according to a second embodiment uses a communication status of the communications unit 13 with respect to the communications partner terminal 2 as one of parameters for deciding whether or not to vary the communicable area 8, which is a major difference from the wireless communications system 10 according to the first embodiment. In the following description, any constituent member of the second embodiment having the same function as a counterpart of the first embodiment described above will be designated by the same reference numeral as that counterpart's, and a detailed description thereof will be omitted herein.

That is to say, in this embodiment, the control unit 12 does not vary the communicable area 8 based on only the magnitude of movement detected by the detection unit 11 of the communications terminal 1 but uses the communication status of the communications unit 13 with respect to the communications partner terminal 2 as another parameter to make the decision. In other words, the control unit 12 varies the communicable area 8 based on both the magnitude of movement of the communications terminal 1 and the communication status of the communications unit 13 with respect to the communications partner terminal 2. As used herein, the "communication status" refers to a status regarding the communication between the communications unit 13 and the communications partner terminal 2 such as whether or not the communications unit 13 is now communicating with the communications partner terminal 2 and how long the communication between the communications unit 13 and the communications partner terminal 2 is going on.

Figure 13:
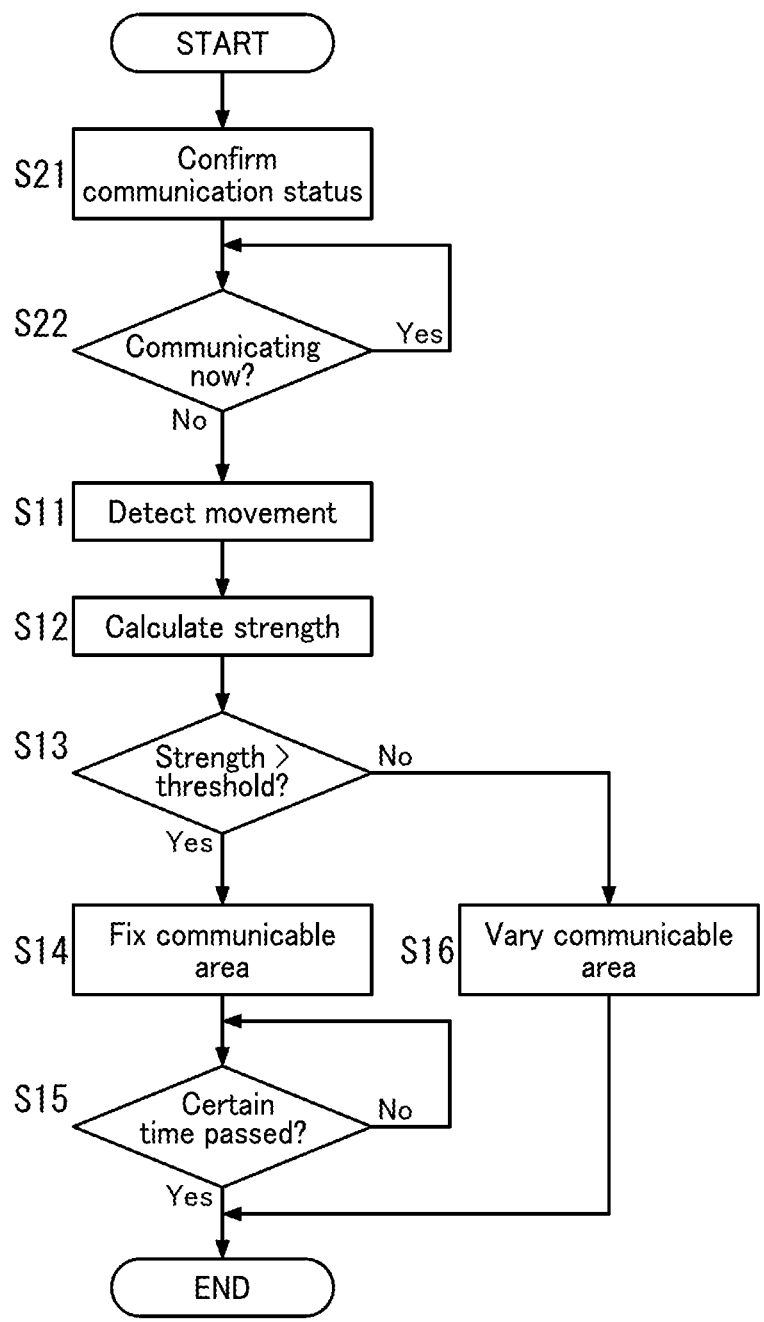
FIG. 13 is a flowchart showing an exemplary procedure of operation of a wireless communications system according to a second embodiment.

Particularly, in this second embodiment, if the communication status indicates that the communications unit 13 is now communicating with the communications partner terminal 2, the control unit 12 fixes the communicable area 8. Specifically, as shown in FIG. 13, the wireless communications system 10 confirms, before making the detection unit 11 detect the movement of the communications terminal 1 (in Step S11), the communication status between the communications unit 13 and the communications partner terminal 2 (in Step S21). If the communication status indicates that the communications unit 13 and the communications partner terminal 2 are communicating with each other (if the answer is YES in Step S22), the wireless communications system 10 does not proceed to the next processing step S11. On the other hand, if the communication status indicates that the communications unit 13 and the communications partner terminal 2 are not communicating with each other (if the answer is NO in Step S22), the wireless communications system 10 proceeds to the processing step S11. After that, the wireless communications system 10 operates just as already described for the first embodiment with reference to the flowchart of FIG. 5. In this case, the processing steps S11-S16 shown in FIG. 13 respectively correspond to the processing steps S1-S6 shown in FIG. 5. Note that the order in which the processing steps S21, S22, and S11-S16 are performed in FIG. 13 is only an example. Optionally, the order of performing these processing steps S21, S22, and S11-S16 may also be changed as appropriate.

Furthermore, in the wireless communications system 10 according to this embodiment, the communications terminal 1 may make the output unit 16 indicate, by displaying a text message or emitting a verbal message, for example, the communication status between the communications unit 13 and the communications partner terminal 2. This allows the user 7 to be notified of the communication status, thus facilitating the user's 7 decision about whether or not to move the communications terminal 1 according to the communication status. For example, the user 7 may decide not to move the communications terminal 1 when the communication status indicates that the communications unit 13 is now communicating with the communications partner terminal 2 and decide to move it otherwise.

Optionally, the constituent elements described for the second embodiment (including variations thereof) may also be used in combination with various constituent elements of the first embodiment (including variations thereof).

(Resume)

As can be seen from the foregoing description, a wireless communications system (10) according to a first aspect includes a communications terminal (1), a detection unit (11), and a control unit (12). The communications terminal (1) includes a communications unit (13) to communicate wirelessly with a communications partner terminal (2). The detection unit (11) detects movement of the communications terminal (1). The control unit (12) controls the communications terminal (1) so as to vary a communicable area (8) of the communications unit (13). The communicable area (8) is defined relatively to the communications terminal (1). The control unit (12) varies the communicable area (8) according to at least magnitude of the movement detected by the detection unit (11).

This aspect allows, when the communications terminal (1) has no movement, a relative positional relationship between the communications partner terminal (2) and the communicable area (8) to be changed by varying the communicable area (8). On the other hand, when the communications terminal (1) has some movement, the relative positional relationship between the communications partner terminal (2) and the communicable area (8) may be changed even without varying the communicable area (8). Thus, this wireless communications system (10) allows the relative positional relationship between the communications partner terminal (2) and the communicable area (8) to be changed appropriately without depending on the movement of the communications terminal (1). Therefore, even when a space where communication loses its stability (i.e., a so-called "null spot") is produced around the communications terminal (1) due to the fading phenomenon, changing the relative positional relationship between the communications partner terminal (2) and the communicable area (8) allows the communications partner terminal (2) to get out of the null spot easily. This eventually increases the success rate of communication between the communications partner terminal (2) and the communications terminal (1).

In a wireless communications system (10) according to a second aspect, which may be implemented in conjunction with the first aspect, the control unit (12) increases a variation in the communicable area (8) as the magnitude of the movement detected by the detection unit (11) decreases.

This aspect allows the communicable area (8) to be varied to an appropriate degree according to the magnitude of the movement of the communications terminal (1), because the smaller the magnitude of the movement detected by the detection unit (11) is, the greater the variation in the communicable area (8) is. This allows the wireless communications system (10) to change the relative positional relationship between the communications partner terminal (2) and the communicable area (8) with good stability without depending on the movement of the communications terminal (1).

In a wireless communications system (10) according to a third aspect, which may be implemented in conjunction with the second aspect, the variation includes amplitude of the variation per unit time in communicable area (8).

This aspect allows, even when the frequency of occurrence of the variation in the communicable area (8) is difficult to change, the variation in the communicable area (8) to be controlled easily, because the variation in the communicable area (8) is adjusted according to the amplitude of the variation per unit time in the communicable area (8).

In a wireless communications system (10) according to a fourth aspect, which may be implemented in conjunction with the second or third aspect, the variation includes a frequency of occurrence of the variation per unit time in the communicable area (8).

This aspect allows, even when the amplitude of the variation in the communicable area (8) is difficult to change, the variation in the communicable area (8) to be controlled easily, because the variation in the communicable area (8) is adjusted according to the frequency of occurrence of the variation per unit time in the communicable area (8).

In a wireless communications system (10) according to a fifth aspect, which may be implemented in conjunction with any one of the first to fourth aspects, the control unit (12) fixes the communicable area (8) when the magnitude of the movement detected by the detection unit (11) is greater than a threshold value.

This aspect allows the relative positional relationship between the communications partner terminal (2) and the communicable area (8) to be stabilized by fixing the communicable area (8) when the communications terminal (1) has relatively significant movement.

In a wireless communications system (10) according to a sixth aspect, which may be implemented in conjunction with any one of the first to fifth aspects, the control unit (12) uses a communication status of the communications unit (13) with respect to the communications partner terminal (2) as one of parameters for deciding whether or not to vary the communicable area (8).

This aspect allows the communicable area (8) to be varied more appropriately compared to a situation where a determination is made based on only the movement detected by the detection unit (11).

In a wireless communications system (10) according to a seventh aspect, which may be implemented in conjunction with the sixth aspect, the control unit (12) fixes the communicable area (8) when the communication status indicates that the communications unit (13) is now communicating with the communications partner terminal (2).

This aspect increases the success rate of communication between the communications partner terminal (2) and the communications terminal (1) by reducing the chances of communication being disrupted by the variation in the communicable area (8) while the communications unit (13) is communicating with the communications partner terminal (2).

In a wireless communications system (10) according to an eighth aspect, which may be implemented in conjunction with any one of the first to seventh aspects, the control unit (12) varies the communicable area (8) by changing at least one parameter selected from the group consisting of: directivity of a communication medium; transmission strength of the communication medium; and reception sensitivity of the communication medium. The communication medium is used by the communications unit (13) to communicate with the communications partner terminal (2).

This aspect allows the communicable area (8) to be varied with a relatively simple configuration by changing at least one parameter selected from the group consisting of: directivity of a communication medium; transmission strength of the communication medium; and reception sensitivity of the communication medium.

In a wireless communications system (10) according to a ninth aspect, which may be implemented in conjunction with any one of the first to eighth aspects, the communications partner terminal (2) is an electronic tag attached to at least one item (commodity 9). The communications terminal (1) reads item information about the item by communicating wirelessly with the communications partner terminal (2) via radio waves.

This aspect allows item information about an item, to which the communications partner terminal (2) is attached, to be acquired easily by the communications terminal (1).

In a wireless communications system (10) according to a tenth aspect, which may be implemented in conjunction with the ninth aspect, the communications partner terminal (2) is a passive electronic tag and includes a memory to store the item information.

This aspect allows the size and cost of the communications partner terminal (2) to be reduced by eliminating the need to build a battery or any other power supply in the communications partner terminal (2).

In a wireless communications system (10) according to an eleventh aspect, which may be implemented in conjunction with the ninth or tenth aspect, the communications partner terminal (2) is associated one to one with the item (commodity 9). The communications partner terminal (2) stores the item information about an associated item. The communications partner terminal (2) is attached to the associated item.

This aspect allows, even when there are multiple items, item information about a particular item to be easily acquired by the communications terminal (1) from the communications partner terminal (2) attached to the particular item.

A method for controlling a communications terminal (1) according to a twelfth aspect is a method for controlling a communications terminal (1) including a communications unit (13) configured to communicate wirelessly with a communications partner terminal (2). This method for controlling a communications terminal (1) includes varying a communicable area (8) of the communications unit (13) according to at least magnitude of movement of the communications terminal (1). The communicable area (8) is defined relatively to the communications terminal (1).

This aspect allows, when the communications terminal (1) has no movement, a relative positional relationship between the communications partner terminal (2) and the communicable area (8) to be changed by varying the communicable area (8). On the other hand, when the communications terminal (1) has some movement, the relative positional relationship between the communications partner terminal (2) and the communicable area (8) may be changed even without varying the communicable area (8). Thus, this method for controlling a communications terminal (1) allows the relative positional relationship between the communications partner terminal (2) and the communicable area (8) to be changed appropriately without depending on the movement in the communications terminal (1). Therefore, even when a space where communication loses its stability (i.e., a so-called "null spot") is produced around the communications terminal (1) due to the fading phenomenon, changing the relative positional relationship between the communications partner terminal (2) and the communicable area (8) allows the communications partner terminal (2) to get out of the null spot easily. This eventually increases the success rate of communication between the communications partner terminal (2) and the communications terminal (1).

Note that these aspects are only exemplary aspects of the present disclosure. That is to say, the present disclosure has many other aspects that have not been mentioned above. For example, various configurations of the wireless communications system (10) according to the first and second embodiments and variations thereof may also be implemented as a method for controlling the communications terminal (1).

Note that the configurations according to the second to eleventh aspects are not essential constituent elements for the wireless communications system (10) but may be omitted as appropriate.

The invention claimed is:
1. A wireless communications system comprising:
a communications terminal including a communications unit configured to communicate wirelessly with a communications partner terminal;
a detection unit configured to detect movement of the communications terminal; and
a control unit configured to control the communications terminal so as to vary a communicable area of the communications unit, the communicable area being defined relatively to the communications terminal,
the control unit being configured to vary the communicable area according to at least a magnitude of the movement detected by the detection unit,
wherein the control unit is configured to use a communication status of the communications unit with respect to the communications partner terminal as one of parameters for deciding whether or not to vary the communicable area,
wherein the control unit is configured to, when the communication status indicates that the communications unit is now communicating with the communications partner terminal, fix the communicable area.

2. The wireless communications system of claim 1, wherein
the control unit is configured to increase a variation in the communicable area as the magnitude of the movement detected by the detection unit decreases.

3. The wireless communications system of claim 2, wherein
the variation includes amplitude of the variation per unit time in the communicable area.

4. The wireless communications system of claim 3, wherein
the variation includes a frequency of occurrence of the variation per unit time in the communicable area.

5. The wireless communications system of claim 3, wherein
the control unit is configured to, when the magnitude of the movement detected by the detection unit is greater than a threshold value, fix the communicable area.

6. The wireless communications system of claim 2, wherein
the variation includes a frequency of occurrence of the variation per unit time in the communicable area.

7. The wireless communications system of claim 6, wherein
the control unit is configured to, when the magnitude of the movement detected by the detection unit is greater than a threshold value, fix the communicable area.

8. The wireless communications system of claim 2, wherein
the control unit is configured to, when the magnitude of the movement detected by the detection unit is greater than a threshold value, fix the communicable area.

9. The wireless communications system of claim 1, wherein
the control unit is configured to, when the magnitude of the movement detected by the detection unit is greater than a threshold value, fix the communicable area.

10. The wireless communications system of claim 1, wherein
the control unit is configured to vary the communicable area by changing at least one parameter selected from the group consisting of: directivity of a communication medium that the communications unit uses to communicate with the communications partner terminal; transmission strength of the communication medium; and reception sensitivity of the communication medium.

11. The wireless communications system of claim 1, wherein
the communications partner terminal is an electronic tag attached to at least one item, and
the communications terminal is configured to read item information about the item by communicating wirelessly with the communications partner terminal via radio waves.

12. The wireless communications system of claim 11, wherein
the communications partner terminal is a passive electronic tag and includes a memory configured to store the item information.

13. The wireless communications system of claim 11, wherein
the communications partner terminal is associated one to one with the item, the communications partner terminal is configured to store the item information about an associated item, and the communications partner terminal is attached to the associated item.

14. A method for controlling a communications terminal including a communications unit configured to communicate wirelessly with a communications partner terminal, the method comprising varying a communicable area of the communications unit according to at least a magnitude of movement of the communications terminal, the communicable area being defined relatively to the communications terminal, using a communication status of the communications unit with respect to the communications partner terminal as one of parameters for deciding whether or not to vary the communicable area, and when the communication status indicates that the communications unit is now communicating with the communications partner terminal, fixing the communicable area.

* * * * *